US011636251B2

United States Patent
Kadia et al.

(10) Patent No.: US 11,636,251 B2
(45) Date of Patent: Apr. 25, 2023

(54) CONTENT AWARE FONT RECOMMENDATION

(71) Applicant: Adobe Inc., San Jose, CA (US)

(72) Inventors: Neel Kadia, Gujarat (IN); Shikhar Garg, New Delhi (IN); Saikat Chakrabarty, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/595,793

(22) Filed: Oct. 8, 2019

(65) Prior Publication Data
US 2021/0103632 A1 Apr. 8, 2021

(51) Int. Cl.
| G06F 40/109 | (2020.01) |
| G06K 9/62 | (2022.01) |
| G06F 40/20 | (2020.01) |
| G06F 40/117 | (2020.01) |
| G06V 30/413 | (2022.01) |

(52) U.S. Cl.
CPC .......... *G06F 40/109* (2020.01); *G06F 40/117* (2020.01); *G06F 40/20* (2020.01); *G06K 9/628* (2013.01); *G06V 30/413* (2022.01)

(58) Field of Classification Search
CPC ...... G06F 40/109; G06F 40/117; G06F 40/20; G06V 30/413; G06K 9/628
See application file for complete search history.

(56) References Cited

U.S. PATENT DOCUMENTS

| 9,721,008 | B1 * | 8/2017 | Byron | G06F 40/284 |
| 2007/0250770 | A1 * | 10/2007 | Gu | G06F 40/226 |
| | | | | 715/210 |
| 2010/0070851 | A1 * | 3/2010 | Chen | G06F 40/14 |
| | | | | 715/236 |
| 2011/0289407 | A1 * | 11/2011 | Naik | G06F 40/109 |
| | | | | 715/269 |
| 2012/0324351 | A1 * | 12/2012 | Gao | G06F 16/9577 |
| | | | | 715/269 |
| 2013/0069983 | A1 * | 3/2013 | Rakshit | G06F 16/5866 |
| | | | | 345/629 |
| 2017/0097948 | A1 * | 4/2017 | Kerr | G06F 16/532 |
| 2017/0109034 | A1 * | 4/2017 | Wang | G06F 40/109 |
| 2017/0206434 | A1 * | 7/2017 | Nariyambut Murali | |
| | | | | G06K 9/4642 |
| 2020/0104851 | A1 * | 4/2020 | Agarwal | G06K 9/00671 |
| 2020/0285916 | A1 * | 9/2020 | Wang | G06F 16/55 |
| 2020/0311186 | A1 * | 10/2020 | Wang | G06N 3/084 |

* cited by examiner

*Primary Examiner* — Howard Cortes
(74) *Attorney, Agent, or Firm* — Nicholson De Vos Webster & Elliott LLP

(57) ABSTRACT

Font recommendation systems and techniques are provided for determining one or more font recommendations. Content aware font recommendations can be determined for an electronic document based on information from the design context of the electronic document. For example, to generate recommended fonts for an electronic document, the font recommendation systems and techniques can obtain one or more images of the electronic document and/or text from the electronic document as input, and can process the one or more images and/or the text to determine recommended font tags. In some cases, recommended fonts can be determined based on user search queries, such as when a user searches for a particular font.

16 Claims, 16 Drawing Sheets

CONTENT AWARE FONT RECOMMENDATION

FIELD

This application is generally related to font recommendations. For example, aspects of this application relate to content aware font recommendation techniques and systems.

BACKGROUND

Selection of appropriate fonts is an important part of many design workflows. When designing a document, a large amount of design time goes in font selection for the document. It would be beneficial to make the task of searching for an appropriate font less tedious for the designer. However, choosing an appropriate font for a design workflow is a very intricate task, in part because selection of appropriate fonts depends on many aspects of the content, such as event, mood, audience, among others. Also, each user is unique and the choice of a particular font can reflect a particular user's design preference.

In many design applications, the font browsing experience includes exposing a user to a long and unintuitive list of fonts. A user is required to scroll through the list to find and select a particular font. Although providing a list of fonts indicates all possible fonts to the user, a lack of any intuitive ordering or suggestion not only constrains, but severely limits the ability of the user to select an appropriate font. Techniques and systems are needed that can provide content aware font recommendations.

SUMMARY

A font recommendation system and related techniques are described herein that can provide content aware font recommendations. For example, the font recommendation system and related techniques can obtain information from the design context of an electronic document, and can use the information to recommend one or more fonts to use for the electronic document. As used herein, an electronic document can include any electronic media content that can be used in an electronic form (e.g., displayed by a display device) and/or as printed output. Examples of electronic documents include a webpage, a page of an application (e.g., a mobile application, a desktop computer application, or other application software), an electronic birthday invitation, an electronic greeting card, a photograph and/or video that may or may not include text, among others.

In some examples, the information obtained by the font recommendation system can include one or images of an electronic document and/or text from the electronic document. For instance, to generate one or more recommended fonts for an electronic document, the font recommendation system and techniques can obtain one or images of the electronic document and/or text from the electronic document as input. The one or more images and/or the text can be processed to generate font tags. In some examples, the one or more images can be processed by a machine learning model (e.g., a neural network, such as a convolutional neural network, or other machine learning model) that is used to determine image tags from the images. In some examples, the text can be processed using natural language processing (NLP), or other suitable technique, to extract words of interest. The words of interest can be used as font tags. In some examples, the font recommendation system and techniques can generate font tags from user search queries (e.g., when a user searches for a particular font). The font tags can be used by the font recommendation system to determine one or more fonts to recommend for use in the electronic document.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Software applications are available that allow a user to design electronic documents, such as digital artwork, webpages of a website, pages of an application, electronic birthday invitations, electronic greeting cards, among other electronic or digital documents. Oftentimes electronic documents include text, and a font selection needs to be made in order to select an appropriate font for the text. Selection of appropriate fonts is an integral part of many design workflows. However, choosing the right font for a design workflow is a very intricate task, in part because selection of appropriate fonts depends on many aspects of the content, such as event, mood, audience, among others. Also, each user is unique and the choice of a particular font can reflect a particular user's design preference. Because of the importance of font selection and the limitations of font browsing features in design applications, a large amount of design time goes into font selection. It would be beneficial to make the task of searching for the right font less tedious for the designer.

Figure 1:
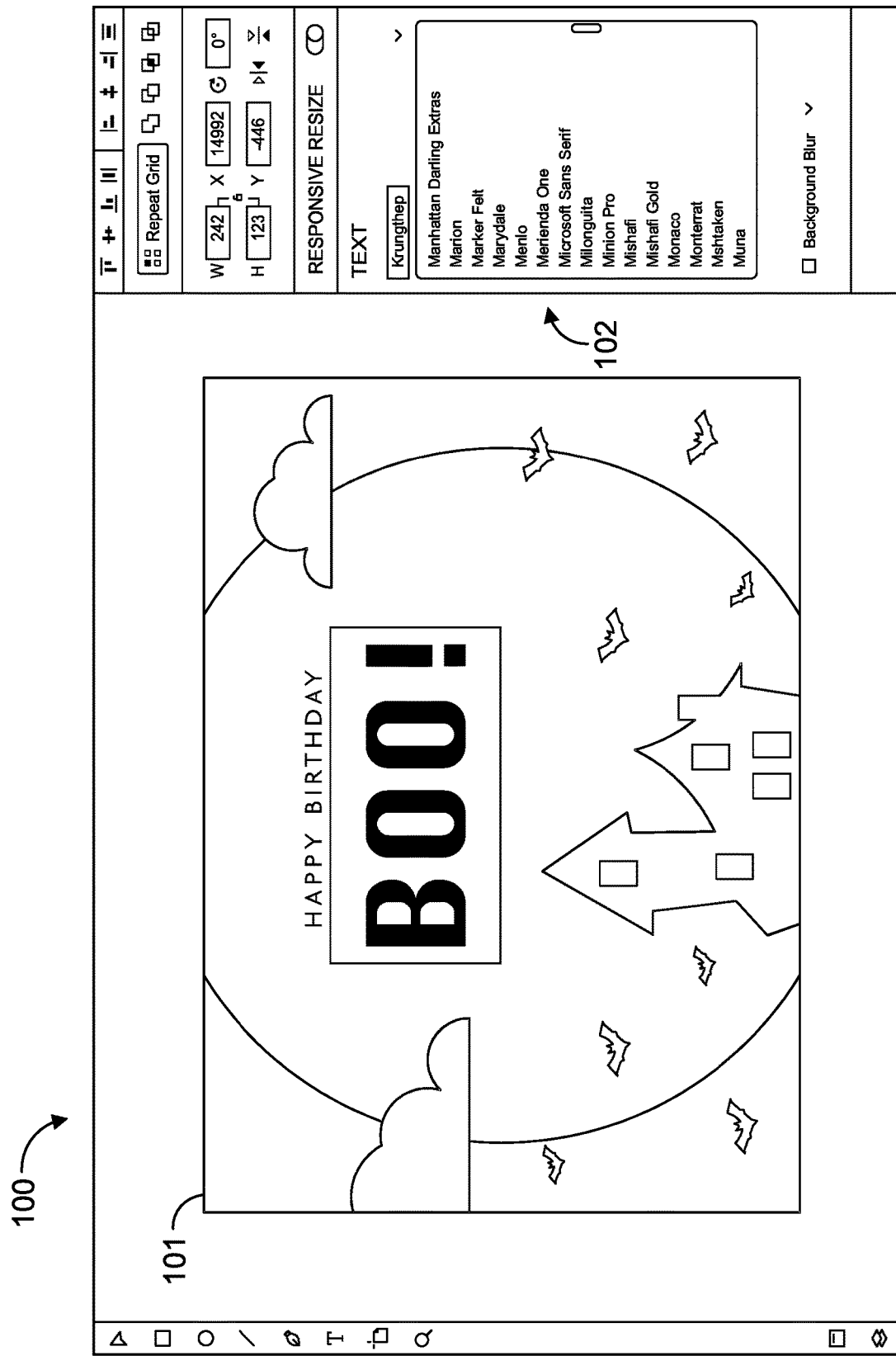
FIG. 1 is a conceptual view of an example user interface of a design application.

The font browsing experience in many design applications includes exposing a user to a long and unintuitive list of fonts, from which the user can select a particular font. FIG. 1 is a conceptual view of an example user interface 100 of a design application. An electronic document 101 is shown on the user interface 100. The electronic document 101 includes an image including bat flying through the sky, clouds, and a castle, as well as text reading "happy birthday" and "boo!". A drop-down menu 102 is provided with a list of fonts. To select an appropriate font for the text portions of the electronic document 101, a user must scroll through the list of fonts in the drop-down menu 102 and select a font to see what the font will look like on the electronic document 101. If the selected font does not satisfy the user's design goals, the user must return to the drop-down menu 102 to select another font. The user must perform this selection process for each text portion until an appropriate font is selected. Although providing a list of fonts in such a drop-down menu is one way to list all the fonts to the user, a lack of any intuitive ordering constrains and severely limits the ability of the user to pick an appropriate font.

Figure 2:
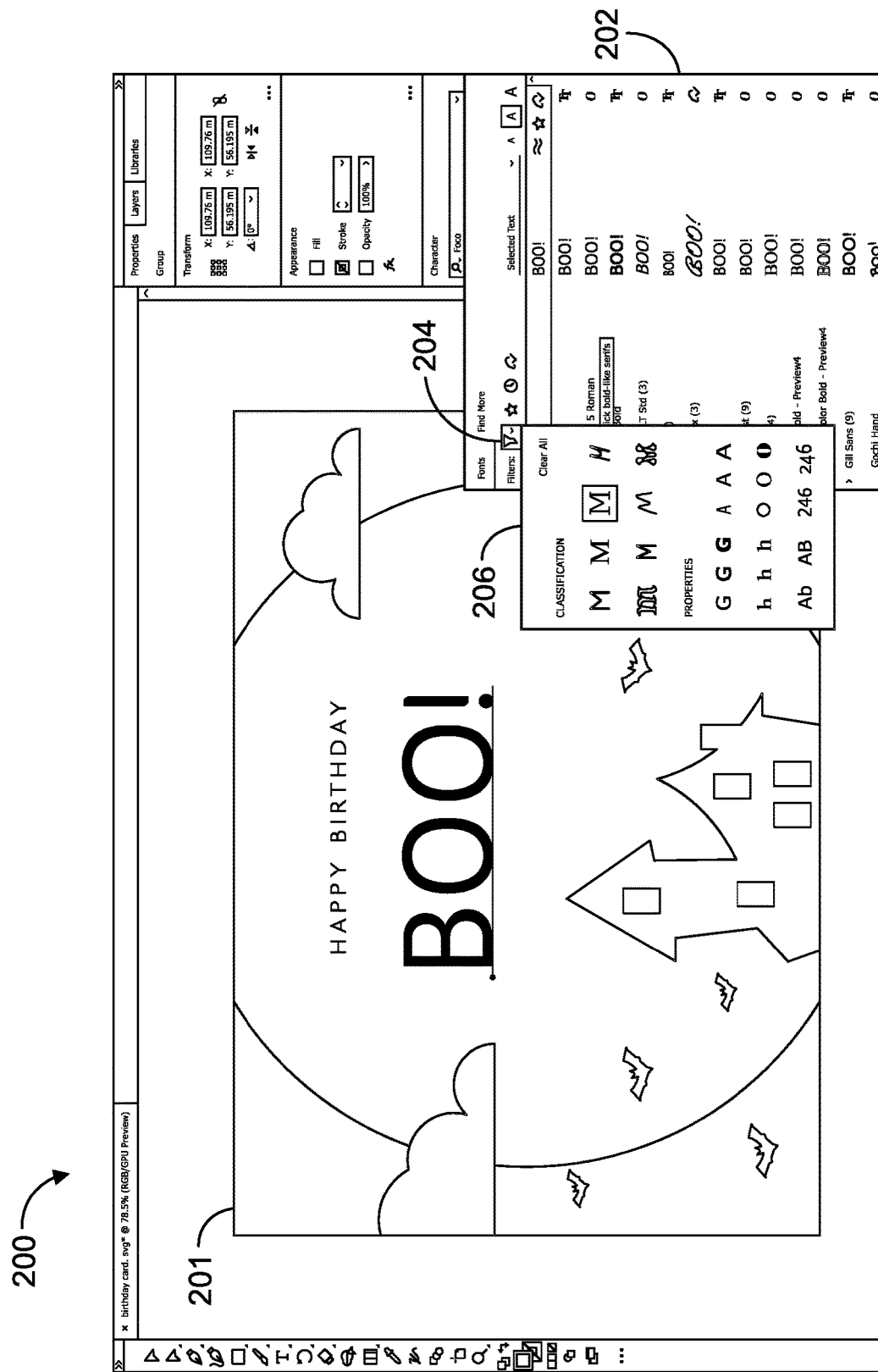
FIG. 2 is a conceptual view of another example user interface of a design application.

Some design applications provide font filters that filter fonts based on certain pre-defined categories. FIG. 2 is a conceptual view of an example user interface 200 of a design application that provides a font filtering option. An electronic document 201 is shown on the user interface 200. A drop-down menu 202 is provided with a list of fonts. A user can scroll through the list of fonts in the drop-down menu 202 and can select a font to see what the font will look like on the electronic document 201. In addition, the user can select a filter option 204 on the user interface 200 to cause a filter window 206 to be displayed. The available fonts of the design application can be filtered based on different classifications or types, including "decorative," "serif," "sans serif," "slab serif," "script," "cursive," "handwritten," among others. As shown in FIG. 2, the "slab serif" (described as "thick bold-like serifs") is selected, which cases all available fonts to be filtered to only include the fonts that have been classified as "slab serif" fonts. However, even using such a filtering mechanism, a user still needs to scroll through the fonts falling under a selected class. Also, a user may be unaware of the different classes of fonts, and thus may be unsure of a particular class to select for filtering.

It has been observed that, based on the analysis of the search suggestions in web search engines, users prefer to search fonts based on simple tags, similar to how searches can be performed for media. Common search queries for fonts include "old school font," "simple elegant font," "formal font," etc. However, design applications do not allow users to search based on tags. An alternative is for a user is to know exactly which font to use and then search the font list of the design application based on the font name. Allowing users to search by tags can provide valuable insight into the intent of the user.

A font recommendation system and associated techniques are described herein that can provide content aware font recommendations. As described in more detail herein, the font recommendation system provides recommended fonts that reflect the design characteristics of an electronic document.

Figure 3:
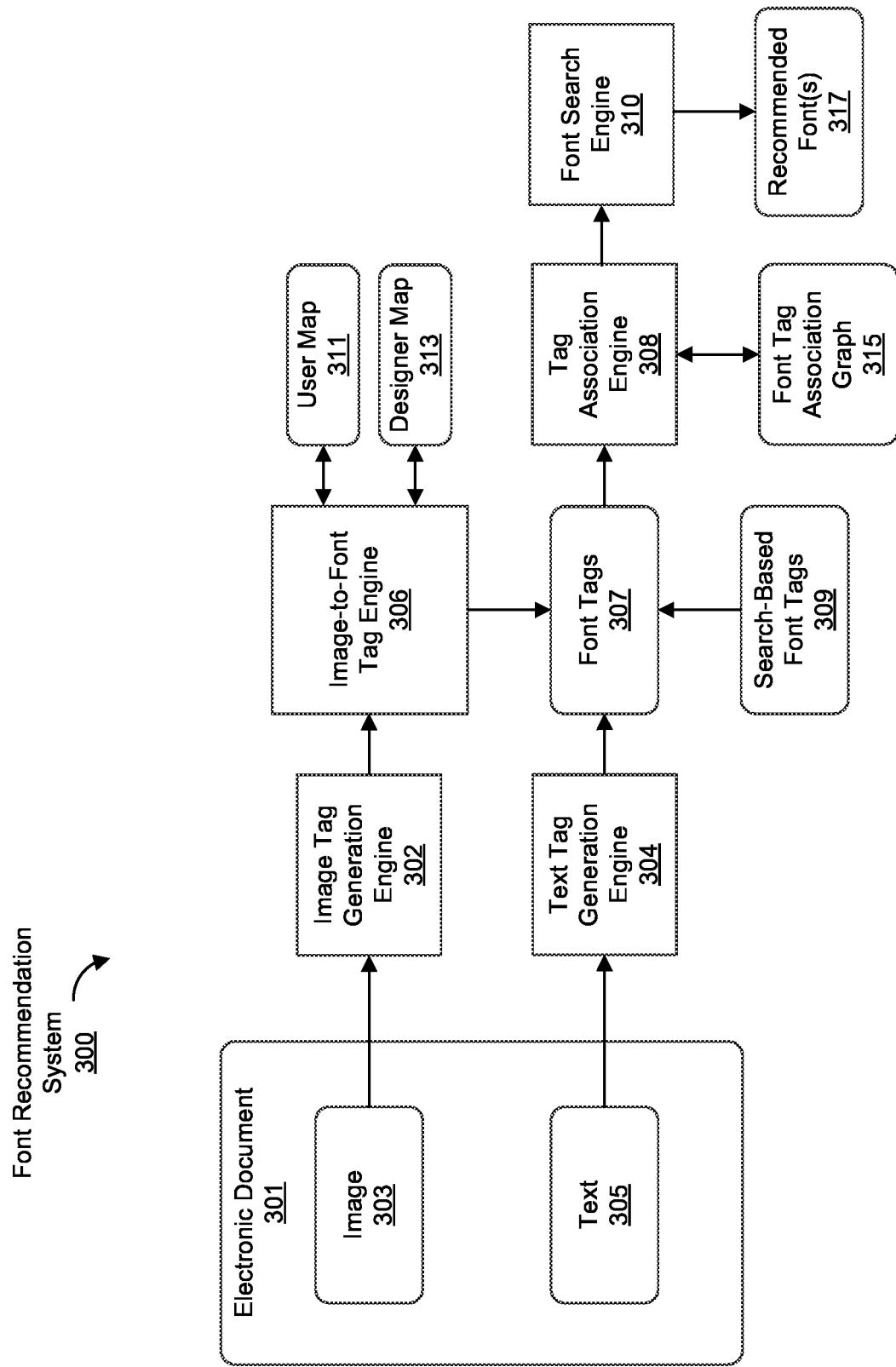
FIG. 3 is a block diagram illustrating an example of a font recommendation system, in accordance with some examples provided herein.

FIG. 3 is a block diagram illustrating an example of a font recommendation system 300. The font recommendation system 300 can use the design context of an electronic document (e.g., electronic document 301) to recommend one or more fonts to use for the electronic document. As noted previously, an electronic document can include any electronic media content that can be used in an electronic form (e.g., displayed by a display device) and/or as printed output. Examples of electronic documents include digital artwork, a webpage, a page of an application (e.g., a mobile application, a desktop computer application, or other application software), an electronic birthday invitation, an electronic greeting card, a photograph and/or video that may or may not include text, among others.

The font recommendation system 300 includes various components, including an image tag generation engine 302, a text tag generation engine 304, an image-to-font tag engine 306, a tag association engine 308, and a font search engine 310. The components of the font recommendation system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the font recommendation system 300 is shown to include certain components, one of ordinary skill will appreciate that the font recommendation system 300 can include more or fewer components than those shown in FIG. 3. For example, the font recommendation system 300 can include, or can be part of a computing device that includes, one or more input devices and one or more output devices (not shown). In some implementations, the font recommendation system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

As noted above, the font recommendation system 300 can be implemented by and/or included in a computing device. For example, the computing device can include a personal computer, a tablet computer, a mobile device (e.g., a mobile phone), a wearable device, a server (e.g., in a software as a service (SaaS) system or other server-based system), and/or any other computing device with the resource capabilities to perform the techniques described herein. In some implementations, the font recommendation system 300 can be integrated with (e.g., integrated into the software, added as a plug-in, or otherwise integrated with) a software application, such as a design application (e.g., Adobe InDesign™, Adobe Illustrator™, Adobe Acrobat™, Adobe Photoshop™, among others) that allows a user (also referred to as an end-user) to design and edit electronic documents. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application.

As a brief overview, the font recommendation system 300 can receive, as input, an electronic document 301. The image tag generation engine 302 generates image tags from one or more images (e.g., image 303) of the electronic document 301. These image tags can be mapped to font tags using the image-to-font tag engine 306. The text tag generation engine 304 can also generate font tags from text 305 of the electronic document 301. The font tags from the one or more images and the font tags from the text 305 are shown in FIG. 3 as font tags 307. Search-based font tags 309 that are input by a user in a search function (e.g., of a software application running the font recommendation system 300) can also be added to the font tags 307. The tag association engine 308 can determine other font tags that are correlated or associated with the font tags 307. The font tags 307 can be augmented to include the correlated or associated font tags. As described in more detail below, the tag association engine 308 can output a font tag data structure (e.g., an n-tuple where n is the number of font tags accessible by the software application, a vector representation, or the like), where each entry in the font tag data structure corresponds to a score of a particular font tag for that user's design content. Each font (which includes a collection of font tags associated with that font) and the font tag data structure can be plotted in a font space, and a comparison can be made (e.g., using a similarity measure, such as Euclidean distance) between the font tag data structure and the various fonts in order to determine the most suitable fonts for the electronic document 301. The determined one or more fonts can be output as the recommended fonts 317.

Detailed operations of the font recommendation system 300 will now be described. As noted above, the font recommendation system 300 can receive the electronic document 301 as input. The electronic document 301 includes one or more images (including image 303) and text 305. While the electronic document 301 is shown to include an image 303 and text 305, one of ordinary skill will appreciate that an electronic document may have one or more images and not text, or may have text and no images, and such an electronic document can be processed by the font recommendation system 300 to recommend one or more fonts for the electronic document. For example, for an electronic document including text and no images, the components of the font recommendation system 300 that process text (e.g., the text tag generation engine 304, the tag association engine 308, and the font search engine 310) can be used to process the text and determine recommended fonts based on the text. In another example, for an electronic document including one or more images and no text, the components of the font recommendation system 300 that process images (e.g., the image tag generation engine 302, the image-to-font tag engine 306, the tag association engine 308, and the font search engine 310) can be used to process the one or more images and determine recommended fonts based on the one or more images. For an electronic document that does not include any text when the font recommendation system 300 processes the electronic document, the font recommendations can be used as suggestions for a user to add text to the electronic document.

The image tag generation engine 302 can obtain the image 303 of the electronic document 301, and can generate one or more image tags from the image 303. In some examples, the image 303 includes an image (e.g., a rasterized image, a vector graphic, or other type of image) of the entire electronic document 301. For instance, the font recommendation system 300, or a computing device including the font recommendation system 300, can capture an image of the electronic document 301 (e.g., an image of the entire electronic document 101 of FIG. 1). In one illustrative example, the font recommendation system or computing device can take a screen capture of the entire electronic document 301. In some implementations, text layers of the design of the electronic document 301 can be excluded from the screen capture. For instance, the design can include multiple layers of media, including one or more image layers and one or more text layers. In such implementations, the image layers can be extracted and analyzed by the image tag generation engine 302, while the one or more text layers are not extracted and analyzed by the image tag generation engine 302. The layers including the text can be analyzed by the text tag generation engine 304 (described below). In some examples, the image 303 can be one image (e.g., a rasterized image or vector graphic) that is included in the electronic document 301, in which case the image tag generation engine 302 can process multiple images of the electronic document 301 to generate image tags from the images. For example, referring to FIG. 14 (discussed in more detail below), the image 303 can include an image 1403 of a man and a young child included in an electronic document 1401. In another example, the image 303 can include an image of one of the bats shown in the electronic document 101 of FIG. 1, an image of the castle shown in the electronic document 101 of FIG. 1, or the like.

In some implementations, the image tag generation engine 302 can include or can utilize a machine learning model to generate or extract image tags from the image 303. For example, the image tags can be generated or extracted by processing the image 303 using one or more classification neural network models. In some cases, a classification neural network model can include a convolutional neural network (CNN). Other machine learning models or neural network models can be used. The input to the machine learning model is an image (e.g., the image 303), such as a rasterized image, of an electronic document (electronic document 301). The machine learning model can classify one or more objects in the image. In one example, given an image of the electronic document 101 shown in FIG. 1, the machine learning model can classify the bats, the castle, the clouds, and the sky present in the image.

The classifications can be used to determine the mood of the electronic document (e.g., scary, comic, etc.), the audience for the electronic document (e.g., kids, young, old, etc.), the type of media in the electronic document (e.g., oil-paint, pencil-sketch, water-color, etc.), among other contextual characteristics of the electronic document. Learning the context of the electronic document helps to identify the fonts required for this image. For example, by classifying the one or more objects in the image, image tags can be generated that represent the classified objects. As described below, the image tags can be used to find font tags, which can then be used to find recommended fonts for the electronic document.

In some examples, the machine learning model (e.g., a neural network, such as a CNN) can include a perspective classification model that classifies objects into classes belonging to different categories or perspectives. In one illustrative example, the image 303 of the electronic document 301 can be classified along a 4-orthogonal axis, with each axis corresponding to a category or perspective. The categories or perspectives corresponding to the 4 axes and classes within each of the categories or perspectives can include the following (denoted as "category={class 1, . . . class m}", where m is a positive integer value):
  user group={older, middle aged, child}
  genre={comic, funky, retro, sci-fi}
  media={oil-painting, pencil-sketched, water color}
  mood={happy, horror, peaceful}

The machine learning model can include different neural networks for each category. An example of such a neural network is discussed below with respect to FIG. 4. Using the example categories from above, a first neural network can be trained and used to classify the image 303 based on the user group. For example, the image 303 can be classified as targeted towards a particular class of user group (also referred to as an audience) that is older (e.g., year 55 and older), middle aged (e.g., years 20-55), or child (e.g., 0-19). A second neural network can be trained and used to classify the image 303 based on genre. For instance, the image 303 can be classified as targeted towards a particular class of genre, including comic, funky, retro, or science-fiction (sci-fi). A third neural network can be trained and used to classify the image 303 based on the type of media. For example, the image 303 can be classified as targeted towards a particular class of media, including an oil-painting, pencil-sketch, or water color. A fourth neural network can be trained and used to classify the image 303 based on the mood. For instance, the image 303 can be classified as targeted towards a particular class of mood, including happy, horror (e.g., for scary documents), or peaceful. The example categories or perspectives noted above can have fewer classes or additional classes. For example, the genre category in some cases can include a "formal" class in addition to the comic, funky, retro, and sci-fi classes. Other categories and associated classes can also be defined.

Each of the neural networks of the machine learning model outputs a probability of whether an object is a particular class of a category or perspective. For example, the first neural network will output a probability that the electronic document 301 depicted in the image 303 is targeted towards an older user group, a probability the electronic document 301 is targeted towards a middle aged user group, and a probability the electronic document 301 is targeted towards a child user group. In another example, the second neural network will output a probability that the electronic document 301 depicted in the image 303 is a comic genre, a probability the electronic document 301 is a funky genre, a probability the electronic document 301 is a retro genre, and a probability the electronic document 301 is a sci-fi genre.

The image tag generation engine 302 can generate image tags based on the probabilities. In some cases, the probabilities are compared against a probability threshold to determine whether the classes will be used as image tags. For instance, a probability determined for a particular class of a category is compared against the probability threshold to determine whether the class will be used as an image tag. The probability threshold can be set to any value (e.g., based on design preferences), such as 0.5, 0.6, 0.7, or other suitable value. In one illustrative example, the probability threshold can be set to 0.5, and the output of the neural network trained for the genre category indicates a 30% probability (corresponding to a value of 0.3) that the electronic document 301 is a comic genre, a 60% probability (corresponding to a value of 0.6) that the electronic document 301 is a funky genre, a 10% probability (corresponding to a value of 0.1) that the electronic document 301 is a retro genre, and a 0% probability (corresponding to a value of 0) that the electronic document 301 is a sci-fi genre. In such an example, a "funky" image tag can be generated for the electronic document.

In some cases, the probabilities of multiple classes in a particular category may be greater than the probability threshold, in which case multiple image tags can be generated for that category. For example, for an image of an electronic document that contains both an older man and a child, the probabilities for the older class and the child class of the user group category will exceed the probability threshold (e.g., for a probability threshold set to 0.7, the probability for the older class is 80%, the probability for the middle-aged class is 20%, and the probability for the child class is 90%). In such an example, an "older" image tag and a "child" image tag are generated by the image tag generation engine 302. In some cases, the probabilities of all classes in a particular category may be below the probability threshold, in which case an image tag is not generated for that category. For example, if the probability threshold is set to 0.6, and the probabilities output by the neural network trained for the mood category classes are all less than 60%, an image tag is not generated by the image tag generation engine 302 for the mood category.

Figure 4:
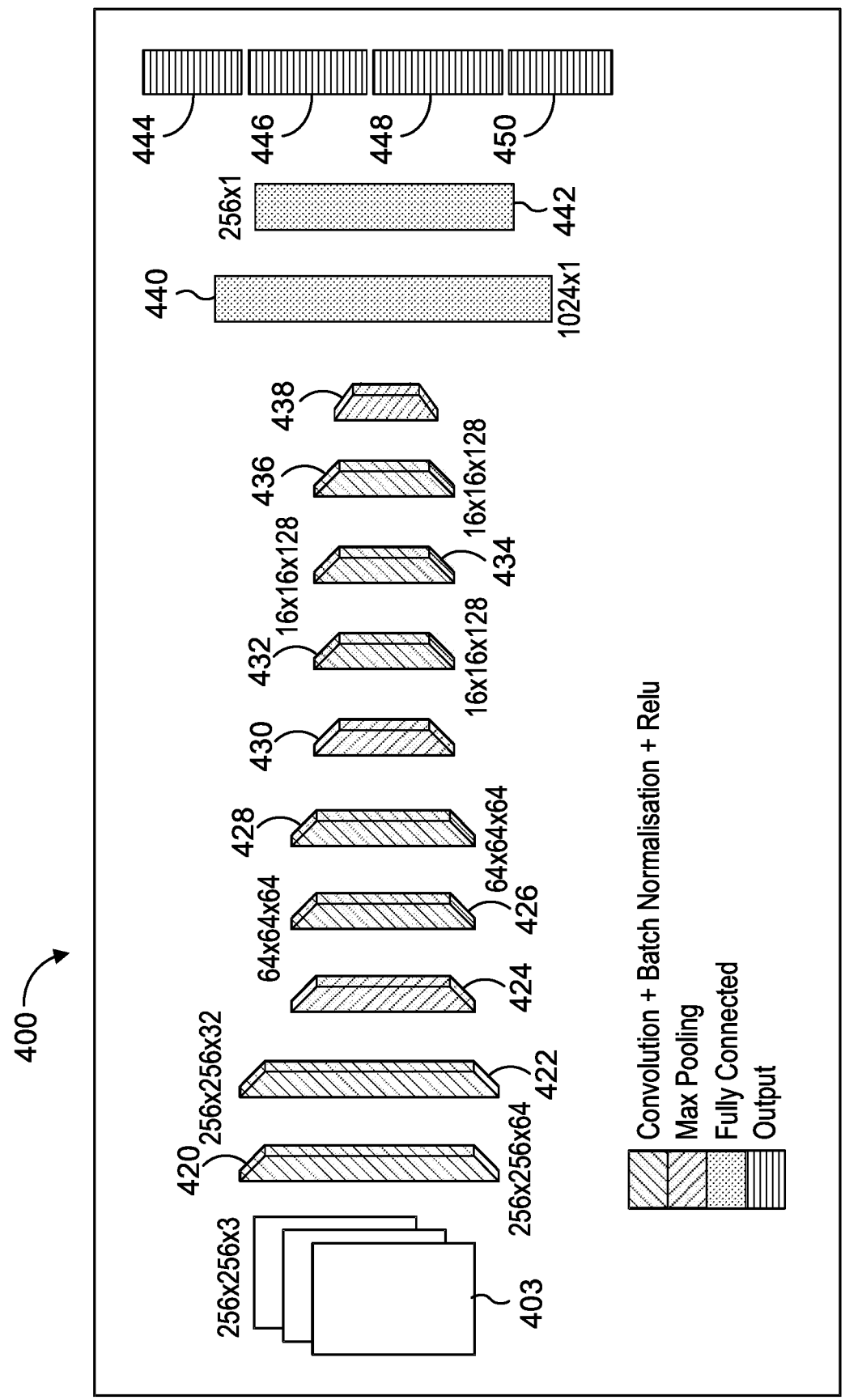
FIG. 4 is a diagram illustrating an example of a neural network, in accordance with some examples provided herein.

FIG. 4 is a diagram of an example neural network 400 that can be used by the tag generation engine 302 to generate image tags for an image, such as the image 303. The neural network 400 shown in FIG. 4 is a convolutional neural network (CNN). The input to the neural network 400 is at least a portion of an image (e.g., the image 303), such as a rasterized image or vector graphic, of an electronic document (e.g., electronic document 301). A rasterized image refers to an electronic or digital image made up of pixels. For example, each pixel in a rasterized image can include one or more color components that define the color for that pixel. The color components making up the pixels can include red (R), green (G), and blue (B) color components, luma (Y) and chroma (e.g., chroma-red (Cr) and chroma-blue (Cb)) color components, or other color components. The pixels of a rasterized image are generally arranged in a two-dimensional grid. The example shown in FIG. 4 uses a rasterized image as an example of an input image. For instance, as shown in FIG. 4, the three color channels (e.g., red, green, and blue) of an image patch 403 (a subset of pixels of the image) having a size of 256×256 (256 pixels by 256 pixels) are input to the neural network 400. In some examples, the image of an electronic document or a portion of an electronic document (e.g., an object depicted in the document) can include a vector graphic or vector drawing. A vector graphic is a digital image that includes points, lines, and/or curves related to one another using mathematical formulas. For example, a vector graphic can include one or more vector graphic segments or curves. A vector graphic segment refers to a vector-based curve or line within a vector graphic. In some examples, a vector graphic segment can include a single scalable curve within a vector graphic, a combination of scalable curves, or a scalable straight line. A vector graphic segment can include any parametric (e.g., cubic polynomial) curve formulation that is able to interpolate a dense array of points. For example, a vector graphic can be defined by mathematical calculations from one point to another that form the vector graphic segments.

As noted above, a machine learning model of the image tag generation engine 302 can include different neural networks for each category. The neural network 400 can be trained to classify the input image as a whole (e.g., the mood of the image) and/or objects in the image into classes of one of the categories. Using the example categories (user group, genre, media, and mood) and classes from above, the neural network 400 can be trained to classify the image and/or objects into classes of one of the categories.

Any suitable dataset can be used to build the neural network 400. In one illustrative example, the Behance Artistic Media (BAM) dataset, or a dataset that includes the BAM dataset and additional tagged data, can be used to build the neural network 400. The BAM dataset is built from Behance, a portfolio website for professional and commercial artists. Behance contains over ten million projects and 65 million images. Artwork on Behance spans many fields, such as sculpture, painting, photography, graphic design, graffiti, illustration, and advertising. Any other dataset including images of different forms of media can be used. In some examples, the neural network 400 can be implemented using Python and Keras as a deep learning framework.

In some examples, the dataset can be pre-processed, which can include resizing of the input images, normalization of the dataset, removal of the alpha channel, etc. The dataset can be split into different sets of data, including one set of data for use as a training dataset to train the neural network 400 model, one set of data for use as a validation dataset, and one set of data for use as a test dataset. In one illustrative example, the dataset can be split into a ratio of 70:10:20 with respect to training (70), validation (10), and test dataset (20). Use of the training, validation, and test datasets are described below.

A goal of the neural network 400 is to maximize the multinomial logistic regression objective (e.g., maximizing the average across training cases of the log-probability of the correct label under the prediction multi class classification distribution). For example, using the training dataset, the neural network 400 can be trained to classify the input image and/or objects in the image into one or more classes. The training dataset can include numerous images and image tag labels that indicate one or more classes of the image in general and classes of objects in the images. In one illustrative example, the neural network 400 can be trained to classify images and objects in images for the user group category, including classes older, middle-aged, and child. The images in the dataset can include many different images of older persons, middle-aged persons, and children, as well as different art work targeted towards older persons, middle-aged persons, and children. Each of the images can be labeled with image tag labels (e.g., older, middle-aged, and/or child image tags) that the neural network uses as a ground truth output.

During training of the neural network 400, a training image can be input to the neural network 400 and a classification output (including one or more probabilities can be generated by the neural network 400. The output can be provided to a loss determination engine (not shown). The loss determination engine can obtain the image tag label (acting as a ground truth output) for that training image, and can compare the image tag label for the training image to the actual output from the neural network 400 to determine the loss associated with the actual output. Using the user group example from above, the input image can include an image with an older man and a young child sitting next to one another, and the image tag labels associated with that training image can include an "older" image tag and a "child" image tag. The loss determined by the loss determination engine can be based on any suitable loss function, such as a using mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other loss function. For instance, using MSE as an example, the loss determination engine can determine the sum of one-half times the ground truth output (the image tag label) minus the output provided by the neural network 400, squared.

Backpropagation can be used to update the parameters of the neural network 400 in order to maximize the multinomial logistic regression objective. For instance, using the determined loss, a backpropagation engine can determine whether parameters (e.g., weights, biases, etc.) of the neural network 400 need to be adjusted to improve the accuracy by reducing the error to be within a certain threshold error or to be within a threshold similarity to the corresponding ground truth output. For instance, based on the determined loss associated with the neural network 400, the backpropagation engine can perform one or more modifications to reduce or minimize the loss. For example, the backpropagation engine can adjust the internal machine learning parameters (e.g., by modifying the weights and/or other parameters associated with various neurons or layers) of the neural network 400, which will effectively change the output generated by the neural network 400 when another input is received, and thus will reduce the overall loss.

Once the parameters (e.g., the weights and/or other parameters of the hidden layers) are adjusted based on the loss, another set of input data and a corresponding image tag labels can be input into the neural network 400. The neural network 400 will then generate another output based on the new set of input data, and the loss determination engine will determine the loss associated with the new output. The loss associated with the new output will again be used to determine how much the neural network 400 needs to be adjusted to further increase its output accuracy. For example, the backpropagation engine can further modify the parameters (e.g., weights and/or other parameters) of the neural network 400 to further reduce the error associated with the neural network 400. The loss determination and backpropagation process can be repeated for several iterations (also referred to as epochs) to improve the accuracy of the first neural network 400 until a predicted output is generated that is below the threshold error or within the threshold similarity of the ground truth output.

The validation dataset is the portion of the entire dataset used to evaluate the neural network 400. The validation dataset is used to provide an unbiased evaluation of a model fit on the training dataset while tuning model the parameters. The parameters of the neural network 400 can be fine-tuned based on results of running the validation data through the neural network 400. In some implementations, 10-fold cross validation can be used. The test dataset is used once the neural network model 400 is fully trained. The test dataset is used to provide an unbiased evaluation of a final model fit on the training dataset.

As shown in FIG. 4, the neural network 400 includes seven convolutional layers (layer 422, layer 426, layer 428, layer 432, layer 434, and layer 436), three pooling layers (layer 424, layer 430, and layer 438), two fully connected layers (layer 440 and layer 442), and four independent output (e.g., softmax) layers (layer 444, layer 446, layer 448, and layer 450).

Batch-normalization and a non-linear function can be applied after every convolutional layer. The non-linear function can be used to introduce non-linearity to a system that has been computing linear operations. One illustrative example of a non-linear function is a rectified linear unit (ReLU) function. A ReLU layer can apply the function f(x)=max(0, x) to all of the values in the input volume (the feature map output from a convolutional layer), which changes the negative activations to 0. The ReLU can thus increase the non-linear properties of the neural network 400. The ReLU non-linearity can be applied to the output of the convolutional and fully-connected layers. The first two convolutional layers 420 and 422 filter the 256×256×3 input image patch 403 with 32 kernels of size 5×5×3 with a stride of 1 pixels. In some examples, padding can be applied to keep the dimension from shrinking. The next two convolutional layers 426 and 428 take as input the max-pooled output of the first two convolutional layers 420 and 422, and filter the output with 64 kernels of size 5×5×64. The remaining convolutional layers 432, 434, and 436 have the filter size of 5×5×64 and have 128 kernels. The convolutional layer 432 takes the max pooled output of the convolutional layer 428 as its input. After the final convolutional layer 436, max pooling is again applied by the max pooling layer 438, and the result is flattened into a 8192×1 vector (8192=8× 8×128). The two fully connected layers 440 and 442 of size 1024×1 and 256×1, respectively, are then applied. In some examples, in order to avoid overfitting, L2 regularization can be used in the fully connected layers 440 and 442.

The pooling layers 424, 430, and 438 can be used to simplify the information in the output from the various convolutional layers. For example, a pooling layer can take each activation map (or feature map) output from a convolutional hidden layer and can generate a condensed activation map using a pooling function. Various pooling functions be used by the pooling layers 424, 430, and 438, such as max pooling, average pooling, L2-norm pooling, or other suitable pooling functions. Max-pooling can be performed by applying a max-pooling filter with a stride amount to an activation map output from a convolutional layer. In one illustrative example, a max-pooling layer with stride of 4 and a filter size of 4×4 can be applied. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For instance, four values (nodes) in an activation map will be analyzed by a 2×2 max-pooling filter at each iteration of the filter, with the maximum value from the four values being output as the "max" value. In one illustrative example, if a max-pooling filter is applied to an activation filter from a convolutional layer having a dimension of 24×24 nodes, the output from the pooling layer will be an array of 12×12 nodes.

The output of the last fully-connected layer 442 is fed to the four output layers 444, 446, 448, 450. The output layers 444, 446, 448, 450 correspond to the classes the neural network 400 is trained to classify, and produce a distribution over their respective class labels (e.g., comic, funky, retro, and sci-fi). For example, using the category (user group, genre, media, and mood) and class examples from above, the neural network 400 can be trained to classify the image and/or objects in the image into classes of the genre category. The output layer 444 can correspond to the comic class, the output layer 446 can correspond to the funky class, the output layer 448 can correspond to the retro class, and the output layer 450 can correspond to the sci-fi class. Neural networks trained for the user group category, the media category, and the mood category can each have three output layers.

As described above, image tags can be generated by the image tag generation engine 302 using the probabilities output by the neural network 400. The image tag generation engine 302 can compare the probabilities to a probability threshold (e.g., 0.5, 0.6, 0.7, or other suitable value) to determine whether the classes will be used as image tags. The determined classes that exceed the threshold are output as image tags by the image tag generation engine 302. The image tags are provided to the image-to-font-tag engine 306.

The image-to-font-tag engine 306 maps the image tags from the image tag generation engine 302 to font tags. The font tags are associated with available fonts accessible by the font recommendation system 300 (e.g., from a local storage location on a computing device including the font recommendation system 300, from a remote storage location, such as a server-based system). Each available font accessible by the font recommendation system 300 can be pre-tagged with a set of tags. For example, as noted above, the font recommendation system 300 can be implemented as part of a software application. The software application, when installed on a device, can include or have access to a group of available fonts and font tags assigned to the available fonts. In one illustrative example, the available fonts can include fonts available through an online service (e.g., Adobe Fonts™ or other font-service) offering a subscription library of fonts that can be used directly from a server-based location or synchronized with and included on the software application. One or multiple font tags can be associated with a particular font. For example, a given font can have a "cursive" font tag and a "smooth" font tag.

Figure 5:
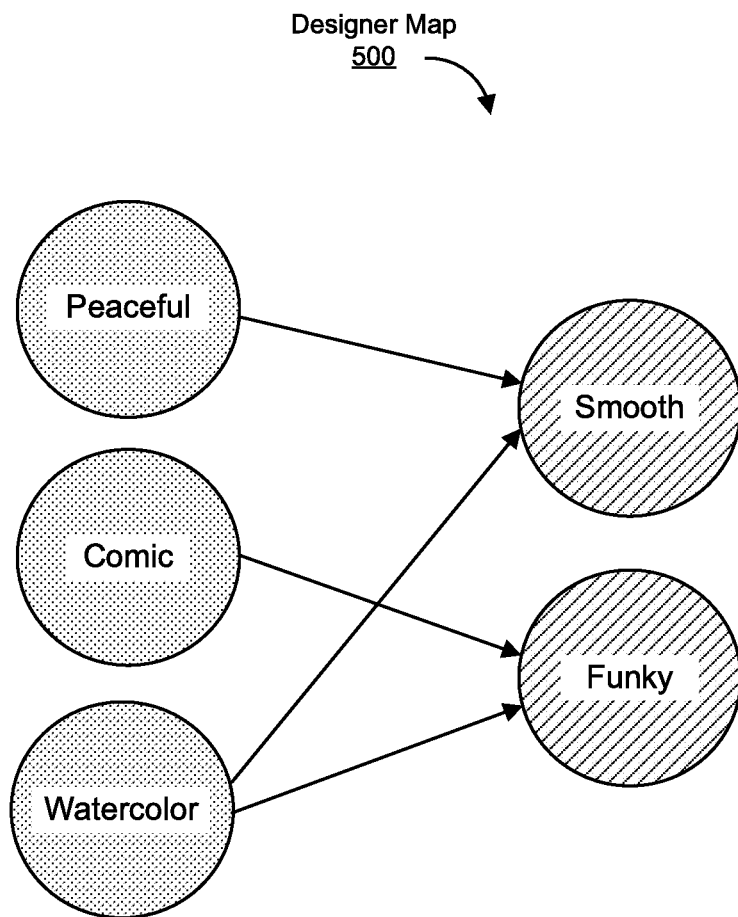
FIG. 5 is a conceptual diagram illustrating an example of a portion of a designer map, in accordance with some examples provided herein.

The mapping can be performed by the image-to-font tag engine 306 using a designer map 313, a user map 311, and one or more contextual synonyms determined (e.g., by the image-to-font tag engine 306) for each image tag. The designer map 313 can be generated by one or more designers of the software application used to implement the font recommendation system 300, and can be provided with the software application. Each entry of a designer map is a mapping (e.g., determined by the designer) from an image tag to a font tag. Each mapping in a designer map can be assigned a path cost of 1 (other path costs can also be assigned). The path cost is used to weight the mapping, as described in more detail below. FIG. 5 is a diagram illustrating an example of a portion of a designer map 500. As shown, the portion of the designer map 500 includes a "peaceful" image tag, a "comic" image tag, and a "watercolor" image tag. The "peaceful" image tag is mapped to a "smooth" font tag, indicating that a peaceful image or a peaceful object in the image is associated (by the designer) with a font that has a smooth characteristic. The "comic" image tag is mapped to a "funky" font tag. The "watercolor" image tag is mapped to the "smooth" font tag and to the "funky" font tag.

The user map 311 provides a mapping between image tags and the font tags based on actual font choices made by one or more users. The mappings in the user map 311 allow the font recommendation system 300 to adaptively learn as the system improves its recommendations based on the calligraphic choices made by various users. The user map 311 can be built based on font choices by multiple users. For instance, in some cases, the user map 311 is not specific to a particular user, and is maintained based on decisions or selections of a global set of users (e.g., users that are registered with a service, system, application, etc. associated with the font recommendation system 300). For example, each user of the software application used to implement the font recommendation system 300 can have a user account, and the software application can store and track font choices made by each user (based on permission given by the user to allow tracking of the font choices). In some cases, the font choices made by the set of users can be sent to one or more servers (or other computing device) that maintain the service, system, application, etc. associated with the font recommendation system 300. The one or more servers or other computing device can update a global user map based on the font choices made by the set of users, and can send the updated global user map to the computing devices of the set of users for use with the font recommendation system 300. For instance, each time one or more users make a typographic decision (e.g., chooses a particular font for a document and saves the document), the global user map can be updated based on the choice and the skill levels of the users (skill level of users is described below).

The user map 311 can be provided to the computing devices of the set of users for use with the font recommendation system 300 in various ways. For example, the font decisions of the set of users can be periodically sent to one or more servers (or other computing devices) to update a global user map. The updated global user map can be periodically sent (e.g., once a day, once a week, once a month, or other time period) to a local computing device (e.g., that is in communication with the one or more servers or other computing device) of a particular user and used as the user map 311. In another example, the decisions of the set of users over a prolonged period of time (e.g., in-between consecutive releases of a version of an application implementing the font recommendation system 300 or other time period) are collected, and the updated global user map can be updated at each prolonged period of time. The updated global user map can be sent to a local computing device (e.g., that is in communication with the one or more servers or other computing device) of a particular user at each prolonged period of time and used as the user map 311.

In some examples, users can be categorized based on their skill level. In one illustrative example, the skill levels can include beginner, intermediate, and advanced. Each mapping in the user map 311 is tagged or marked with advanced, intermediate, or beginner, depending on the skill level of the user from whom the mapping is derived. The skill level can be used to weight users' selections of fonts. For instance, as described in more detail below, advanced user mappings can be assigned a path cost of 1, intermediate user mappings can be assigned a path cost of 2, and beginner user mappings can be assigned a path cost of 3. Other path costs can also be assigned to the different skill levels.

The skill level of a user can be determined based on historical data associated with the user, such as the number of electronic document designs the user has created (e.g., the more electronic documents a user creates, the more advanced the user can be considered), a length of time the user has had an account with the software application or a service hosting the software application (e.g., the longer a user has had an account, the more advanced the user can be considered), the time it takes the user to select a font for given text (e.g., the quicker a user selects a font, the more advanced the user can be considered), any combination thereof, and/or other historical data. If skill level cannot be determined (e.g., the user has not allowed data the software application to store historical data of the user, etc.), the user is determined to be at the lowest skill level. In some examples, decisions made by a user can be used to provide suggestions to other users with the same or lower skill levels, which can help users with lower skill levels to advance their typographic design skills. For instance, when suggesting fonts for an intermediate user, the mappings tagged with intermediate and advanced are considered.

Figure 6:
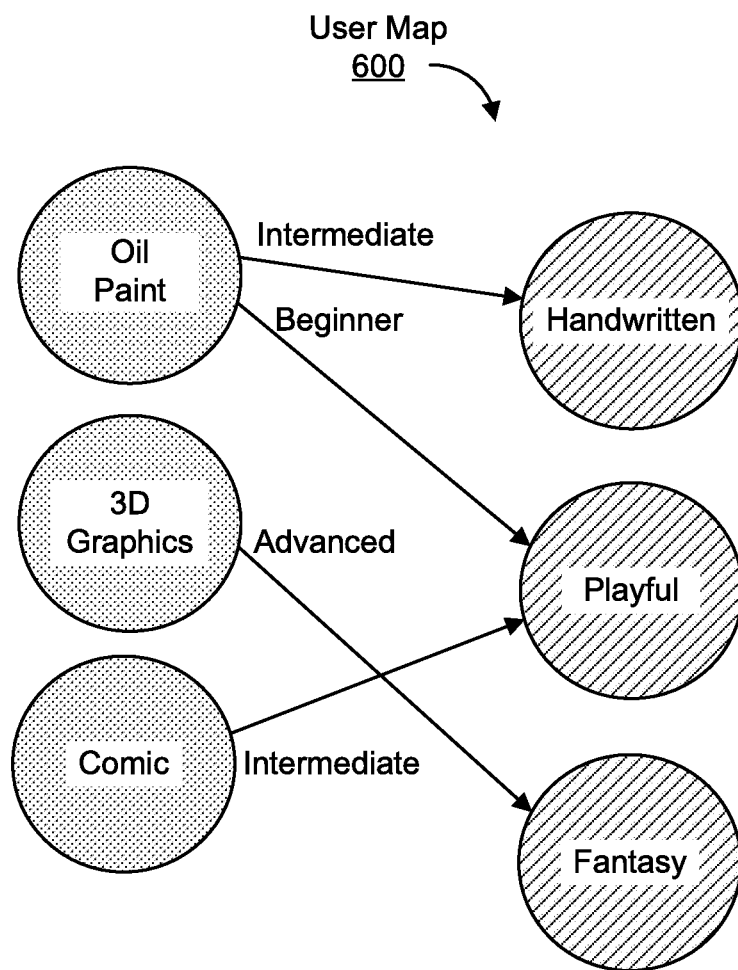
FIG. 6 is a conceptual diagram illustrating an example of a portion of a user map, in accordance with some examples provided herein.
Figure 6:
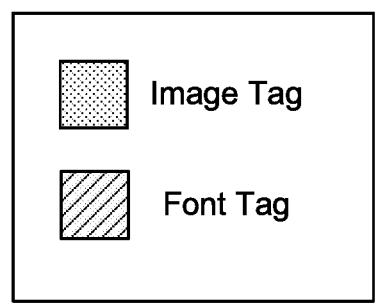

FIG. 6 is a conceptual diagram illustrating an example of a portion of a user map 600. As shown, the portion of the user map 600 includes an "oil paint" image tag, a "3D graphics" image tag, and a "comic" image tag. The "oil paint" image tag is mapped to a "handwritten" font tag, as a result of an intermediate user selecting a font having the "handwritten" font tag assigned to it for an electronic document that has been classified with an "oil paint" class. The "oil paint" image tag is also mapped to a "playful" font tag based on a beginner user selecting a font having the "playful" font tag assigned to it for an electronic document that has been classified with the "oil paint" class. The "3D graphics" image tag is mapped to a "fantasy" font tag based on an advanced user selecting a font having the "fantasy" font tag assigned thereto for an electronic document classified with a "3D graphics" class. The "comic" image tag is mapped the "playful" font tag in response to an intermediate user selecting a font having the "playful" font tag assigned to it for an electronic document classified with a "comic" class.

Figure 7:
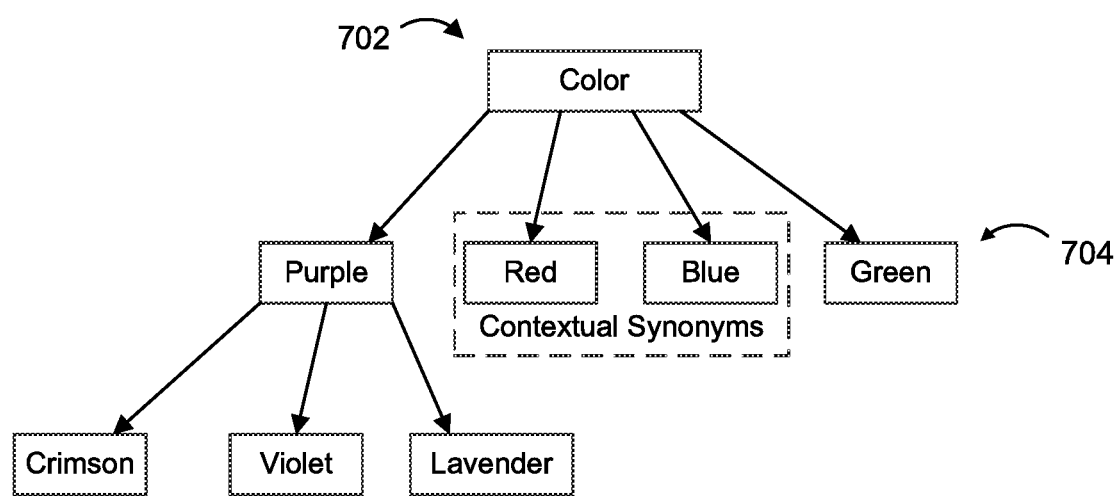
FIG. 7 is a conceptual diagram illustrating an example of a hypernym and examples of hyponyms, in accordance with some examples provided herein.

A contextual synonym (also known as co-hyponym) of a word is a synonym of the word which also shares the same hypernym. FIG. 7 is a conceptual diagram illustrating an example of a hypernym "color" 702 and examples of hyponyms 704 of the hypernym "color" 702. The hyponyms 704 include "purple," "red," "blue," and "green." As shown, the terms "red" and "blue" are considered contextual synonyms. Contextual synonyms can be determined using a word database, such as Wordnet. For instance, Wordnet lists hypernyms and synonyms for every word. Using the hypernyms and synonyms, a contextual synonym can be determined for a word.

As noted above, the image-to-font tag engine 306 can take into account the designer map 313, the user map 311, and one or more contextual synonyms of each image tag when mapping the image tags to the font tags. The mapping is performed for each image tag generated for the image 303. As described in more detail below, the image-to-font tag engine 306 can compute a path cost to travel from each image tag to zero or more font tags. A tag score can be computed for each font tag by taking the inverse of a minimum path cost needed to get to that font tag. The tag score indicates how spontaneously the font tag relates to the image tags.

In one illustrative example, the image-to-font tag engine 306 can obtain a series of image tags {CT1, CT2, . . . , CTx}, where x is a positive integer value, from the image tag generation engine 302. For each image tag CTi (where i=1, 2, . . . , x), the image-to-font tag engine 306 starts with a cost factor of 1, and determines a path cost for each image tag CTi by performing a path cost determination process. To determine the path cost using the path cost determination process, the image-to-font tag engine 306 determines whether there is a mapping starting with CTi in the designer map 313 and/or in the user map 311. In some examples, for the user map 311, the image-to-font tag engine 306 considers only those mappings tagged with a skill level that are the same or higher than the skill level of the current user that is creating the electronic document 301. In some examples, all mappings in the user map 311 can be considered, regardless of the skill level of the current user.

If a mapping is available in the designer map 313 and/or the user map 311, the image-to-font tag engine 306 can obtain the path cost of the mapping and multiply the path cost by the cost factor. As noted above, each mapping in a designer map is assigned a path cost of 1. For the user map 311, the image-to-font tag engine 306 can determine the path cost of the mapping based on the skill level of the user. For instance, as noted above, advanced user mappings are assigned a path cost of 1, intermediate user mappings are assigned a path cost of 2, and beginner user mappings are assigned a path cost of 3. One example a mapping determined by the image-to-font tag engine 306 is a mapping from the image tag CTi to a font tag FTj (denoted as a mapping CTi→FTj, where j is a positive integer value).

In some cases, an image tag CTi can be mapped to multiple font tags FTj, FTk, etc. (denoted as {CTi→FTj, CTi→FTk, . . . }, where j and k are different positive integer values) in the user map 311 and/or in the designer map 313. If there are multiple mappings for the image tag CTi, the image-to-font tag engine 306 can obtain the path cost for all mappings (e.g., the path cost for CTi→FTj, the path cost for CTi→FTk, etc.) and can multiply each path cost with the cost factor. In some cases, the same mapping between the image tag CTi and a particular font tag can exist with multiple path costs. For instance, a mapping between an image tag and a font tag can exist in the user map 311, and the same mapping between the image tag and the font tag can exist in the designer map 313. If the same mapping exists for the image tag CTi with multiple path costs, the image-to-font tag engine 306 can choose the mapping with the minimum path cost and can multiply the minimum path cost with the cost factor. In one illustrative example, a mapping of CTi→FTj can be found in the designer map 313 with a path cost of 1, and the same mapping of CTi→FTj can be found in the user map 311 with a path cost of 2. In such an example, the image-to-font tag engine 306 can choose the path cost of 1.

In some cases, a mapping for the image tag CTi may not exist in the user map 311 or in the designer map 313. If a mapping is not available, and if the cost factor is greater than a cost factor threshold, the image-to-font tag engine 306 stops the path cost determination process. The cost factor threshold can be set to any suitable value. Illustrative examples of the cost factor threshold can include a value of 15, 20, or other suitable value. When the path cost determination process for a particular path associated with the font tag CTi is stopped for an image tag CTi, the path is discarded. There may be other paths between the font tag CTi and the font tag FTi, in which case the other paths can still be analyzed using the path cost determination process. If a mapping is not available, and if the cost factor is not greater than (or is less than) the cost factor threshold, the image-to-font tag engine 306 can find a contextual synonym for the image tag CTi. The image-to-font tag engine 306 can replace the image tag CTi with the contextual synonym, multiply or increase the cost factor by a factor of 2, and repeat the path cost determination process. Increasing the cost factor by a factor of 2 when a contextual synonym is obtained for an image tag has the effect that the path cost is halved each time a contextual synonym is determined. For instance, if a contextual synonym of an image tag is determined, the path cost of the contextual synonym is halved as compared to the path cost of the underlying image tag. Halving the path cost results in doubling of a tag score of a font tag, which is determined as the inverse of a minimum path cost of the font tag, as described below.

The result of the path cost determination process for an image tag CTi is the determination of a path cost to travel from the image tag to zero or more font tags. The path cost is a property of the image tag and the font tag to which the image tag is mapped. In general, the lower the path cost, the better the font tag describes the class represented by the image tag. Based on this general principle, a tag score is computed for each font tag by taking the inverse of minimum path cost (e.g., if the path cost is three, the computed tag score is ⅓ or 0.33). Values of tag score for each font tag lies between 0 and 1. The minimum path cost can be used because, as described above, there can be instances when a particular font tag can be mapped with multiple image tags, but the mappings can have different path costs. For instance, a font can be mapped directly to an image tag, and can also be mapped to a contextual synonym of an image tag. In such examples, the minimum path cost associated with a font tag can be used to determine the tag score for that font tag. In one illustrative example, if the mapping CT1→FT1 exists in the user map 311 (beginner user: path cost 3), and the mapping CT2→FT1 also exists in the user map (intermediate user: path cost 2), the minimum path cost to FT1 is 2, and hence the tag score for the font tag FT1 is determined to be ½ or 0.5. If a font tag is not mapped to any image tag in the mapping procedure, the minimum path cost to the font tag is considered to be infinite. If the minimum path cost to a font tag is infinite, the tag score is 0.

Figure 13:
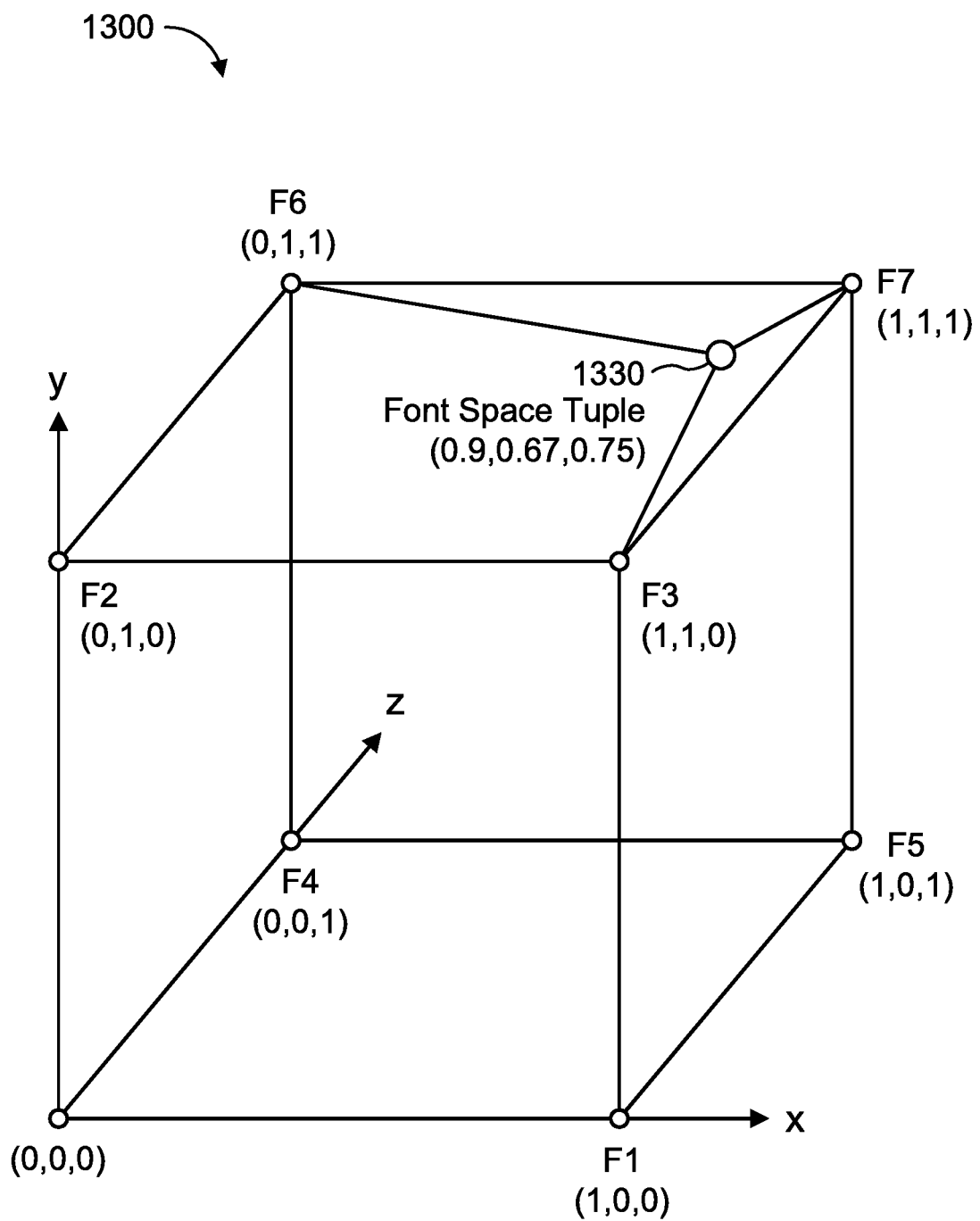
FIG. 13 is a conceptual diagram illustrating an example of a font search performed in a three-dimensional font space, in accordance with some examples provided herein.

The tag scores for the font tags can be arranged in a font tag data structure (e.g., an n-tuple, also referred to as a font space tuple, a vector representation, or other data structure) and plotted in a font space along with the font tags for all available fonts accessible by the software application implementing the font recommendation system 300. In one illustrative example, assuming there exists three font tags (FT1, FT2, FT3) with tag scores of FT1=0.33, FT2=0.0, and FT3=0.17, the virtual representation of the electronic document 301 can be plotted in the font space at coordinates (0.33, 0.0, 0.17), which lies within a unit three-dimensional 3D cube (e.g., as shown in FIG. 13, which is described below). As described in more detail below, the font search engine 310 can determine one or more recommended fonts 317 by comparing the tag scores with the available font tags.

Figures 8A, 8B, 8C:
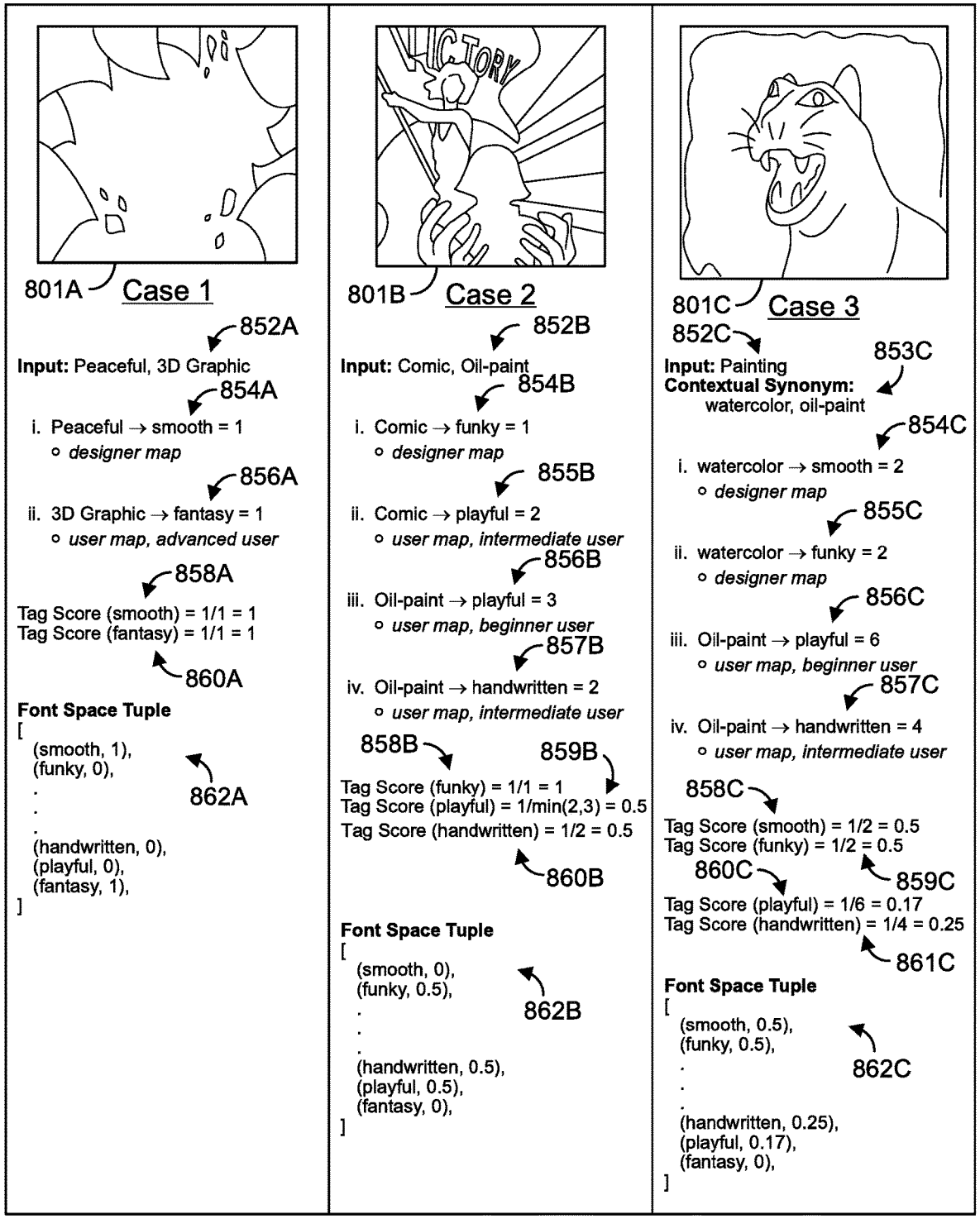
FIG. 8A, FIG. 8B, and FIG. 8C are diagrams illustrating example cases of mappings of image tags to font tags and associated tag scores, in accordance with some examples provided herein.

FIG. 8A, FIG. 8B, and FIG. 8C are diagrams illustrating example cases of mappings of image tags to font tags and associated tag scores. As shown in FIG. 8A, an electronic document 801A is shown that is a 3D graphic. Image tags 852A generated by the image tag generation engine 302 for the electronic document 801A include a "peaceful" image tag (e.g., based on a "peaceful" class of the mood category) and a "3D graphic" image tag (e.g., based on a "3D graphic" class of the media category). Other image tags either were not generated for the electronic document 801A, or image tags that were generated for the electronic document 801A were below the probability threshold.

The "peaceful" and "3D graphic" image tags 852A are provided as input to the image-to-font tag engine 306. As shown in FIG. 8A, an image-to-font tag mapping 854A of peaceful-to-smooth is obtained from the designer map 313. The peaceful-to-smooth mapping 854A has a path cost of 1, based on each mapping in a designer map being assigned a path cost of 1. As noted above, other path costs can be assigned to the designer map mappings. The tag score 858A for the "smooth" font tag is determined as the inverse of the path cost (1/1), and thus is determined to be 1. An image-to-font tag mapping 856A of 3D graphic-to-fantasy is obtained from the user map 311 based on input from an advanced user. The graphic-to-fantasy mapping 856A has a path cost of 1, based on the mapping being from an advanced user. The tag score 860A for the "fantasy" font tag is determined as the inverse of the path cost (1/1), and thus is also determined to be 1.

A font space tuple 862A is generated that includes n-tag scores, with a tag score being included for each font tag (n font tags) maintained by the software program implementing the font recommendation system 300. As shown, only the "smooth" and "fantasy" font tags include tag score values in the font space tuple 862A. As noted above, font tags that are not mapped to any image tag in the mapping procedure are assigned a tag score of 0 (e.g., based on the minimum path cost for the font tags being considered as infinite). The font space tuple 862A thus has values of 0 for each of the font tags other than the "smooth" and "fantasy" font tags.

In FIG. 8B, an electronic document 801B is shown. The image tag generation engine 302 generates the image tags 852B for the electronic document 801B, which include a "comic" image tag (e.g., based on a "comic" class of the genre category) and an "oil-painting" image tag (e.g., based on an "oil-painting" class of a media category). As shown, an image-to-font tag mapping 854B of comic-to-funky is obtained from the designer map 313, and has a path cost of 1. The tag score 858B for the "funky" font tag is determined to be 1 (the inverse of the path cost (1/1)). An image-to-font tag mapping 857B of oil-painting-to-handwritten is obtained from the user map 311 based on input from an intermediate user, and thus has a path cost of 2. The tag score 860B for the "handwritten" font tag is determined to be 0.5 (the inverse of the path cost (½)).

The "playful" font tag has two paths, including one path from the "comic" image tag and one path from the "oil-painting" image tag. For example, an image-to-font tag mapping 855B of comic-to-playful is obtained from the user map 311 based on input from an intermediate user, and has a path cost of 2 based on the mapping being from an intermediate user. An image-to-font tag mapping 856B of oil-painting-to-playful is also obtained from the user map 311. The oil-painting-to-playful mapping is based on input from a beginner user, and thus has a path cost of 3. The minimum path cost is used to determine the tag score 859B for the "playful" font tag. For example, the tag score 859B for the "playful" font tag is determined as the inverse of the minimum path cost (which in the example of FIG. 8B is 2), and is thus determined to be 0.5 (based on the inverse of the path cost of 2 or ½). By considering the minimum path cost, the image-to-font tag engine 306 is weighting the font choice of the intermediate user higher than the beginner user.

A font space tuple 862B is generated that includes n-tag scores (a tag score for each of the n-font tags maintained by the software program implementing the font recommendation system 300). As shown, the "funky," "handwritten," and "playful" font tags include tag score values in the font space tuple 862B, and the remaining font tags have tag scores of 0 based on those font tags not being mapped to any image tag in the mapping procedure.

In FIG. 8C, an electronic document 801C is shown. Image tags 852C generated by the image tag generation engine 302 for the electronic document 801C include a "painting" image tag. In the example categories provided above (user group, genre, media, and mood), there is no "painting" class. The image-to-font tag engine 306 can determine contextual synonyms 853C for the "painting" class, which include the "watercolor" image tag and the "oil-painting" image tag. An image-to-font tag mapping 854C of watercolor-to-smooth is obtained from the designer map 313. The watercolor-to-smooth mapping has a path cost of 2, due to the "watercolor" image tag being a contextual synonym. For example, as noted above, the cost factor is increased by a factor of 2 when a contextual synonym is obtained for an image tag, which is then multiplied by the path cost of the contextual synonym during the path cost determination process. The tag score 858C for the "smooth" font tag is determined to be 0.5 (the inverse of the path cost (½)).

An image-to-font tag mapping 855C of watercolor-to-funky is obtained from the designer map 313, and has a path cost of 2 based on the mapping being of a contextual synonym of the "painting" image tag. The tag score 859C for the "funky" font tag is determined to be 0.5 (the inverse of the path cost (½)). An image-to-font tag mapping 856C of oil-painting-to-playful is obtained from the user map 311 based on input from a beginner user. The oil-painting-to-playful mapping 856C has a path cost of 6 based on the mapping being from a beginner user (path cost of 3) and based on "oil-painting" being a contextual synonym of "painting." The tag score 860C for the "playful" font tag is determined to be 0.17 (the inverse of the path cost (⅙)). An additional image-to-font tag mapping of the "oil-painting" image tag is also determined, and includes an oil-painting-to-handwritten mapping 857C obtained from the user map 311 based on input from an intermediate user. The oil-painting-to-handwritten mapping 857C has a path cost of 4 based on the mapping being from an intermediate user (path cost of 2) and based on "oil-painting" being a contextual synonym of "painting." The tag score 861C for the "handwritten" font tag is determined to be 0.25 (the inverse of the path cost (¼)).

A font space tuple 862C is generated that includes n-tag scores (a tag score for each of the n-font tags maintained by the software program implementing the font recommendation system 300). As shown, the "smooth," "funky," "handwritten," and "playful" font tags include tag score values in the font space tuple 862C, and the remaining font tags have tag scores of 0 based on those font tags not being mapped to any image tag in the mapping procedure.

Figure 9:
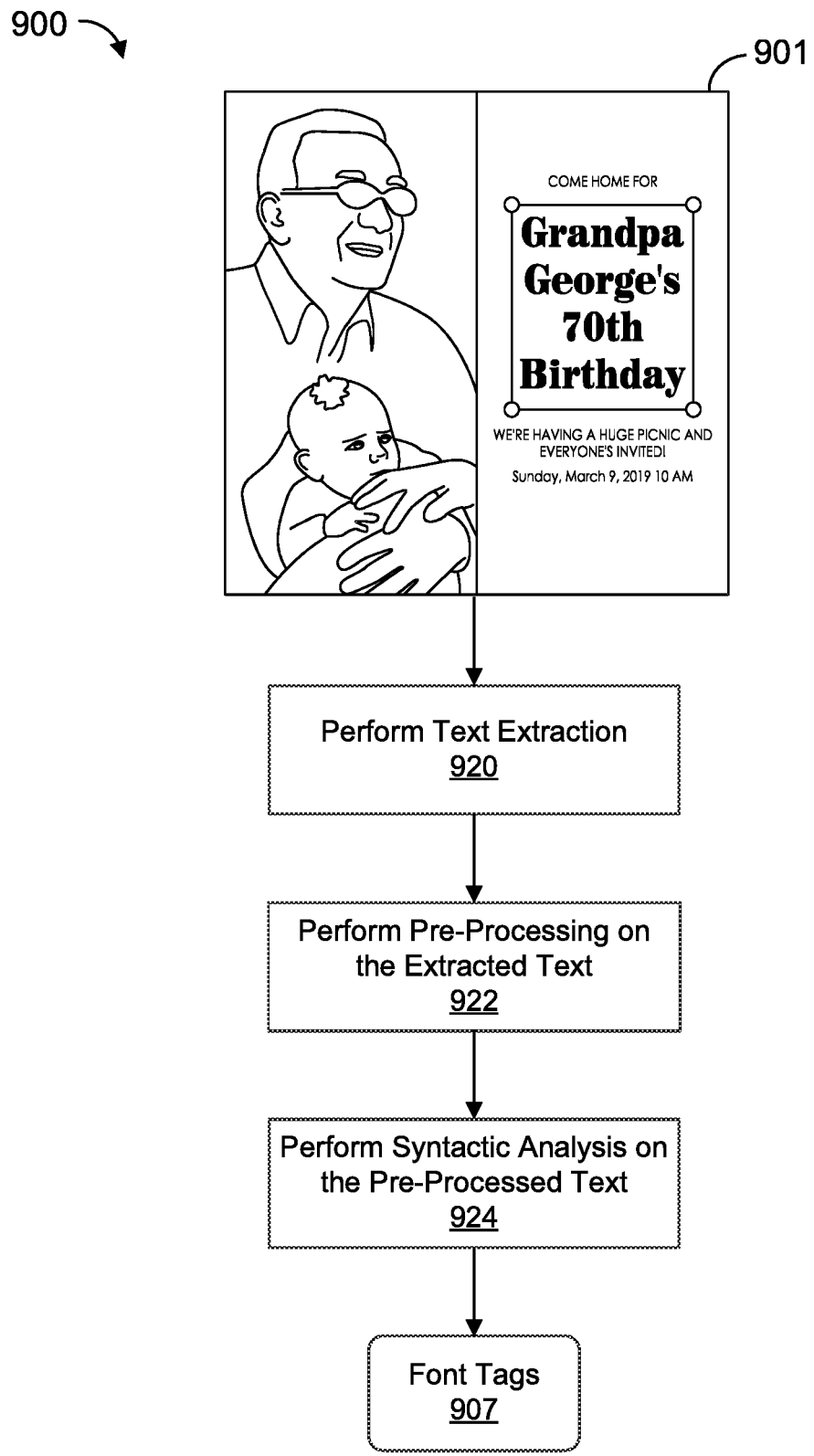
FIG. 9 is a diagram illustrating an example of a process of determining font tags from text of an electronic document, in accordance with some examples provided herein.

The text tag generation engine 304 can extract the text 305 from the electronic document 301, and can process the text (e.g., using natural language processing techniques) to generate additional font tags. FIG. 9 is a diagram illustrating an example of a process of determining font tags from text of an electronic document 901. The process 900 can be performed by the text tag generation engine 304. At block 920, the process 900 extracts the textual information from the entire electronic document 901 or from a selected portion of the electronic document 901. For example, as noted above, the design of the electronic document 301 can include multiple layers of media in some cases, including one or more image layers and one or more text layers. The text layers can be extracted and analyzed by the text tag generation engine 304, while the one or more image layers are not extracted and analyzed by the text tag generation engine 304. Whether text from the entire electronic document 901 or text from a selected portion of the electronic document 901 is analyzed can be a setting (e.g., a user selectable setting or a pre-configured setting that cannot be changed by a user) of the software application implementing the font recommendation system 300.

At block 922, the process 900 includes performing pre-processing on the extracted text. The pre-processing can include any suitable pre-processing step performed for natural language processing (NLP). For example, stop words can be removed from the text. Stop words are words that are filtered out before processing of natural language data (text). Stop words generally have little meaning, and includes words such as articles, prepositions, among others. Illustrative examples of stop words include "the," "is," "at," "which," "on," among others. After pre-processing of the electronic document 901, the remaining words can include "grandpa," "birthday," "picnic," and "invited." Another pre-processing technique that can be performed includes stemming. Stemming is a technique used to reduce certain words to their base form. For example, the term "going" will be reduced to "go." As another example, the term "are" can be reduced to "be."

At block 924, the process 900 can include performing syntactic analysis on the words remaining after the pre-processing performed at block 922 in order to determine words of interest. The words of interest can be assigned as the font tags 907. Any syntactic analysis technique can be used by the text tag generation engine 304. In some implementations, the syntactic analysis performed by the text tag generation engine 304 can include NLP, in which case the text tag generation engine 304 can apply NLP to the terms "grandpa," "birthday," "picnic," and "invited" in order to determine words of interest that are associated with those terms. For example, the text tag generation engine 304 can have access to a list of words of interest. The text tag generation engine 304 can look up a term provided by the pre-processing step, such as "grandpa," and determine if the word included in the list of words of interest. If the word is not in the list, the text tag generation engine 304 can determine if there are any synonyms of the word that are in the list of words of interest. If the word or any synonyms of the word are in the list, the text tag generation engine 304 assigns the word of interest as a font tag for the electronic document 901. Based on the terms "grandpa," "birthday," "picnic," and "invited," the words of interest determined to be used as font tags for the electronic document 901 can include, for example, "birthday," "older man," and "invitation." In such an example, the text tag generation engine 304 can generate an "older man" font tag, and an "invitation" font tag for the electronic document 901.

The font tags generated by the image-to-font tag engine 306 and the text tag generation engine 304 can be stored as font tags 307. The font recommendation system 300 can also generate font tag based on user search queries (e.g., when a user searches for a particular font). For example, search-based font tags 309 can be added to the font tags 307. The search-based font tags 309 can be provided by a user utilizing a search function of the software application running the font recommendation system 300. For example, referring to FIG. 14 (discussed in more detail below), a search field 1440 is provided that allows a user to enter keywords to search for certain fonts. The keywords can be used as the search-based font tags 309. The inclusion of the search-based font tags 309 can also allow for user customization based on the keywords. For example, the keywords provided in a search query describe the qualities that a user is looking for in a font, which helps the system incorporate the user's own design preferences in the recommended fonts. The keywords in the search query convey the user's perspective on the kind of font that is appropriate for the design. Such information can be useful and can complement the content analysis because the user's input adds a semblance of personalization to the font recommendation search.

The font recommendation system 300 can also compensate for lack of expressivity in user's search query. For instance, in some cases, a user may input a search query that is not expressive enough for the search to show useful results. In one example, a user may input certain keywords for the font search, but the font desired by the user does not include any of the keyword-based font tags. The tag association engine 308 described below can help determine appropriate fonts based on keywords that are not associated with any font.

The font tags 307 can be provided to the tag association engine 308, which can determine whether there are other font tags that are correlated or associated with the font tags 307. The font tags 307 can be augmented to include the correlated or associated font tags determined by the tag association engine 308. As described in more detail below, the tag association engine 308 can output an updated font tag data structure (e.g., an n-tuple with n being the number of font tags accessible by the software application, a vector representation, or the like) that includes the tag scores of the font tags 307, and also includes the tag scores of any additional font tags determined to be correlated with the font tags 307.

A font tag association graph 315 can be used by the tag association engine 308. In some examples, the font tag association graph 315 can be pre-computed (prior to use of the font recommendation system 300 being used by an end-user) and included as part of the software application implementing the font recommendation system 300. In some examples, the font tag association graph 315 can be computed by the tag association engine 308 as the font recommendation system 300 being used by an end-user. In some implementations, the font tag association graph 315 is a bidirected graph representing correlations (or associations) between various font tags available in or accessible by the software application. The font tag association graph 315 can be constructed using the various font tags for the different available fonts accessible to the software application. The nodes of the graph represent the various font tags. The edges represent the associations between the corresponding tags and the edge scores (acting as weights) quantify the corresponding association. For example, an edge between two nodes (each node representing a font tag) denotes that the two font tags occur together in one or more fonts (e.g., the two font tags are used to describe the one or more fonts).

Figure 10:
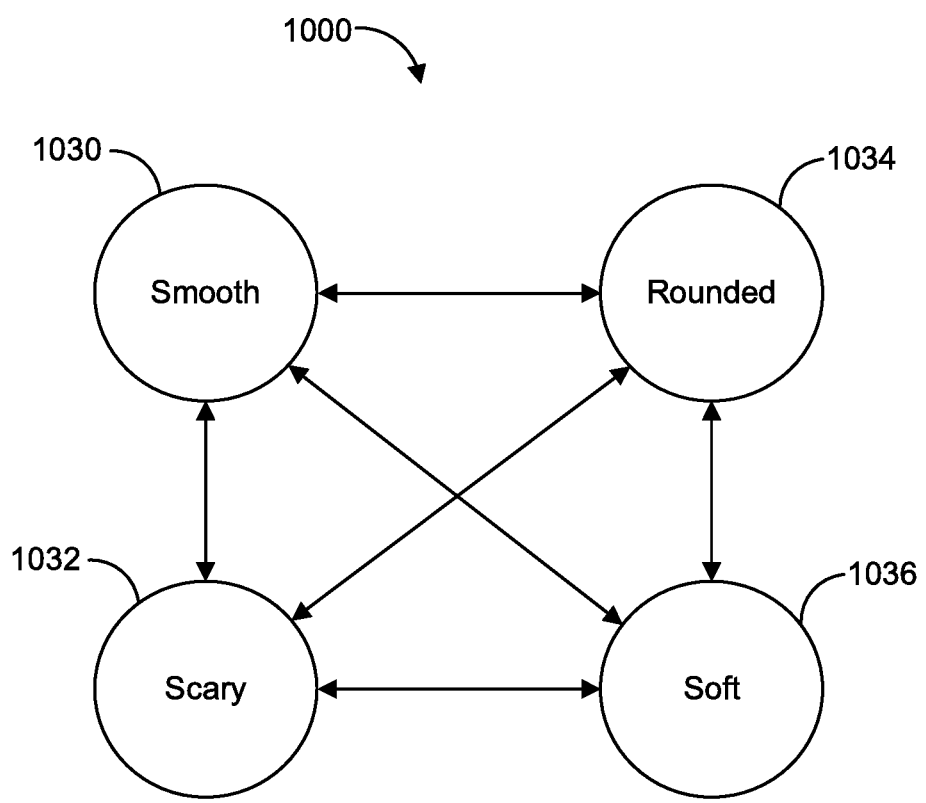
FIG. 10 is a conceptual diagram illustrating an example of a font tag association graph, in accordance with some examples provided herein.

FIG. 10 is a conceptual diagram illustrating an example of a portion of a font tag association graph 1000. The nodes of the font tag association graph 1000 represent a "smooth" font tag 1030, a "scary" font tag 1032, a "rounded" font tag 1034, and a "soft" font tag 1036. The edges between the various font tags, 1030, 1032, 1034, and 1036 represent associations between the tags. For example, the "smooth" font tag 1030 is directly associated with the "scary" font tag 1032, the "rounded" font tag 1034, and the "soft" font tag 1036 based on the direct connection between the "smooth" font tag and the font tags 1032, 1034, and 1036. The "smooth" font tag 1030 is also indirectly associated with the "soft" font tag 1036, since it is directly associated with the "rounded" font tag 1034 and the "rounded" font tag 1034 is directly associated with the "soft" font tag 1036. Such a situation can occur when the "smooth" font tag 1030 and the "soft" font tag 1036 do not co-occur together in any font, but there is a common font tag between them in the font tag association graph 1000. In such an example, the "rounded" font tag 1034 is considered an intermediate node between the "smooth" font tag 1030 and the "soft" font tag 1036.

Figure 11:
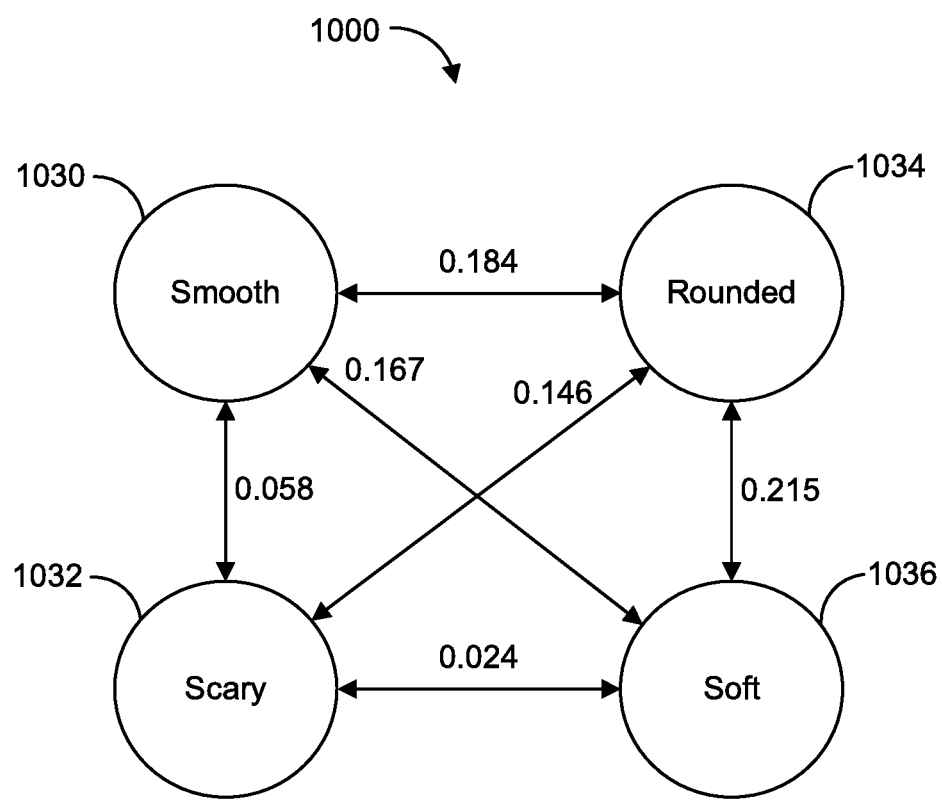
FIG. 11 is a conceptual diagram illustrating an example of the font tag association graph from FIG. 10 with edge scores, in accordance with some examples provided herein.

FIG. 11 is a conceptual diagram illustrating an example of the portion of a font tag association graph 1000 along with edge scores for each of the edges between nodes. As shown, an edge weight 0.058 is assigned to the edge between the "smooth" font tag 1030 and the "scary" font tag 1032, an edge weight 0.184 is assigned to the edge between the "smooth" font tag 1030 and the "rounded" font tag 1034, and an edge weight 0.167 is assigned to the edge between the "smooth" font tag 1030 and the "soft" font tag 1036. Other edge scores are also shown in FIG. 11 between other font tags of the font tag association graph 1000.

In some cases, an evidence metric can be used as the edge score. The evidence score can be determined as follows:

$$\text{Evidence} = k = \frac{|T_i, T_j|}{|T_i|}, \quad \text{Equation (1)}$$

where $T_i$ is the i-th font tag, $|T_i|$ is the total number of fonts for which Tag $T_i$ occurs (e.g., the number of times $T_i$ is used to describe a font), $T_j$ is the j-th font tag, and $|T_i, T_j|$ is the total number of fonts for which the tag $T_i$ and the tag $T_j$ occur together (e.g., the number of times both tags are used to describe the same font). The evidence Equation (1) intuitively indicates that how many times the font tag $T_j$ occurs with the font tag $T_i$ (the numerator, $|T_i, T_j|$) when the font tag $T_i$ occurs in a font (the denominator, $|T_i|$. The evidence Equation (1) indicates the relevancy or strength of the association between the two tags $T_i$ and $T_j$ occurring together.

In some examples, the evidence Equation (1) can lead to high edge scores for popular font tags that occur with many other font tags. For example, the "serif" font tag is used to describe many fonts. In some implementations, an edge score calculation is developed that can be used to determine the edge scores. For instance, the edge score between font tags $T_i$ and $T_j$ can be computed as follows:

$$\text{Edge Score} = EC(T_i, T_j) = \left( \frac{|T_i, T_j|^2}{\sqrt{|T_i| * |T_j| + \varepsilon}} \right)^{\frac{1}{\gamma}}, \quad \text{Equation (2)}$$

where $T_i$ is the i-th font tag, $|T_i|$ is the total number of fonts in which Tag $T_i$ occurs, $T_j$ is the j-th font tag, $|T_i, T_j|$ is the total number of fonts in which the tag $T_i$ and the tag $T_j$ occur together (referred to as a co-occurrence), and Gamma(a)=$a^{(1/gamma)}$ (gamma is denoted as γ).

The edge score Equation (2) indicates how relevant two font tags $T_i$ and $T_j$ are to each other based on the co-occurrences of those font tags in describing one or more fonts. As noted above, the evidence score Equation (1) divided with only the edge of one tag $T_i$, which can lead to high edge scores for associations involving popular font tags (e.g., the "serif" font tag, or other font tag) that occur with many other font tags. The edge score Equation (2) penalizes popular font tags. Such popular font tags that occur with numerous other font tags may not be as useful as other, less common font tags. In one illustrative example, a popular tag is "sans-serif". If a user searches for "smooth" font, there may be a high possibility that the tag "sans-serif" occurs in every font in which smooth occurs. In such an example, the evidence Equation (1) would give an evidence score of 100% to the edge between "sans-serif" and "smooth," resulting in a very general result that would not lead to targeted font recommendations. In the edge score Equation (2), by dividing by the occurrences of both font tags Ti and Tj (e.g., "sans-serif" and "smooth" in the example above), the frequent occurrence of popular font tags are taken into account.

The epsilon term (ε) is added for numerical stability to prevent the Equation (2) from dividing by zero or very small values. The ε term can be set to any suitable value, such as a value of 0.001, 0.0001, or other value. Inclusion of the ε term can be important as the edge score values are used as multiples during the path score calculations by the tag association engine 308, the ε term can ensure that the calculation can be carried out using appropriate precision.

Illustrative examples of gamma (γ) values include 2, 2.2, 2.4, 2.5, 2.8, 3, 3.4, 4, or other suitable value. For example, if γ is equal to 3, the cubed root of the value is determined. The 1/gamma (1/γ) term provides exponential growth for the computed edge score, and can be used to lower the deviation between computed edge scores. For instance, font tags $T_1$ and $T_2$ can co-occur five times together (e.g., for five different fonts), and font tags $T_3$ and $T_4$, can co-occur ten times together (e.g., for ten different fonts). However, it is beneficial to avoid determining the edge score between the font tags $T_3$ and $T_4$ as twice the value of the edge score between the font tags $T_1$ and $T_2$. Raising the computed value to the power of 1/γ operates to lower the deviation between the two edge scores.

Figure 12:
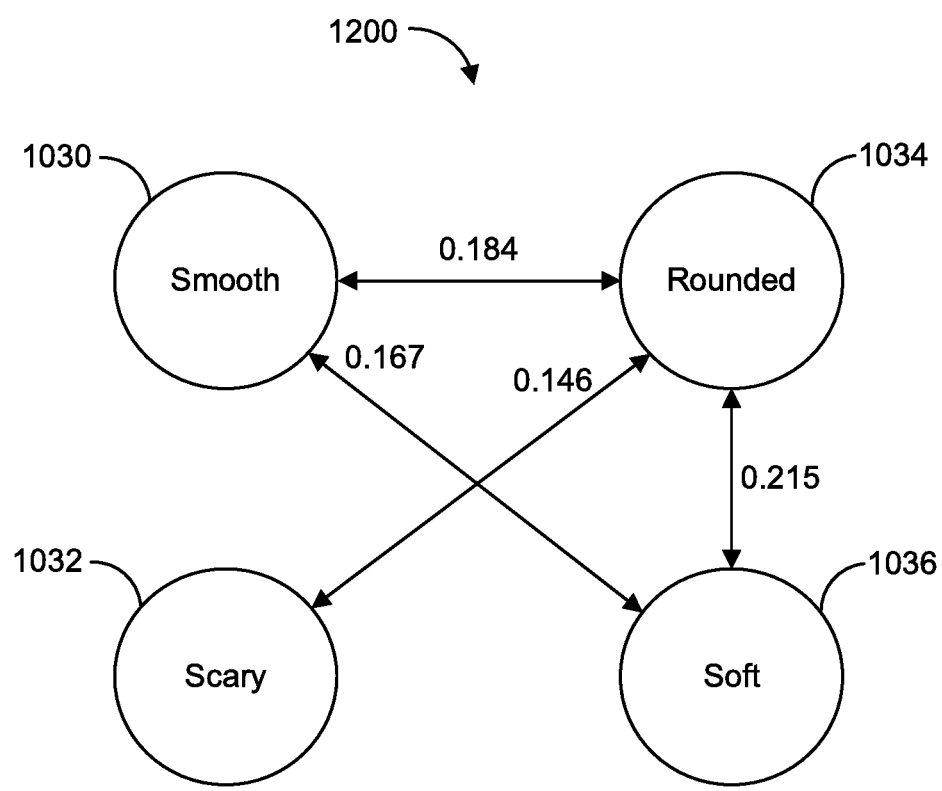
FIG. 12 is a conceptual diagram illustrating an example of the font tag association graph from FIG. 10 with edges removed based on the edge scores shown in FIG. 11, in accordance with some examples provided herein.

In some examples, based on the edge scores determined using Equation (1) or Equation (2), the tag association engine 308 can remove certain edges from consideration. For example, a minimum edge score (or minimum evidence level) can be defined as the minimum edge score threshold below which the association between two tags can be considered negligible. Edges with edge scores below the minimum edge score threshold can be removed by the tag association engine 308. FIG. 12 is a conceptual diagram illustrating an example of the font tag association graph 1000 from FIG. 10 with certain edges removed based on the edge scores shown in FIG. 11. In one illustrative example, the minimum edge score threshold can be set to a value of 0.1, in which case the edge between the "smooth" font tag 1030 and the "scary" font tag (having an edge score of 0.058) and the edge between the "scary" font tag 1032 and the "soft" font tag (having an edge score of 0.024) are removed, as shown in FIG. 12. The remaining edges are maintained due to the edge scores being greater than the minimum edge score threshold.

The tag association engine 308 can determine a path score between a source node (denoted as $Node_{source}$) and a destination node (denoted as $Node_{destination}$) by performing a path score determination process. The path score indicates the strength of the association (or correlation) between two font tags. For example, two font tags that are directly connected with an edge (there are no intermediate nodes in the font tag association graph 315) have a stronger association than two font tags that are indirectly connected through various intermediate nodes in the font tag association graph 315.

To perform the path score determination process, the tag association engine 308 can determine that there are $p_1, p_2, \ldots p_i$ paths from the $Node_{source}$ to the $Node_{target}$, where i is a positive integer value. In some examples, the path score determination process is performed only for nodes and edges that remain after certain edges are removed based on the minimum edge score threshold. Referring to FIG. 12 as an illustrative example, two paths $p_1$ and $p_2$ are included from the "smooth" font tag 1030 (as a source node) to the "rounded" font tag 1034 (as a destination node). The first path $p_1$ is a direct connection between the "smooth" font tag 1030 and the "rounded" font tag 1034 (smooth→rounded, shown with an edge score of 0.184). The second path $p_2$ between the "smooth" font tag 1030 and the "rounded" font tag 1034 is an indirect connection (smooth→soft→rounded), with the "soft" font tag 1036 being an intermediate node that sits between the "smooth" font tag 1030 and the "rounded" font tag 1034. As shown in FIG. 12, two different paths ($p_1$ and $p_2$) are also depicted in the font tag association graph 1200 between the "smooth" font tag 1030 (as a source node) and the "soft" font tag 1036 (as a destination node), including a direct connection (smooth→soft, shown with an edge score of 0.167) and an indirect connection (smooth→rounded→soft) with the "rounded" font tag 1034 being an intermediate node between the "smooth" font tag 1030 and the "soft" font tag 1036.

The tag association engine 308 can also determine $n_q$ intermediate nodes between a $Node_{source}$ and a $Node_{target}$ on the i-th path (where q is a value greater than or equal to 0). For example, as shown in FIG. 12, the first path $p_1$ between the "smooth" font tag 1030 (as a source node) and the "soft" font tag 1036 (as a destination node) is a direct path (smooth→soft), in which case there are 0 ($n_q$=0) intermediate notes. The second path $p_2$ between the "smooth" font tag 1030 (as a source node) and the "soft" font tag 1036 (as a destination node) is an indirect path (smooth→rounded→soft), with the "rounded" font tag 1034 being an intermediate node between the "smooth" font tag 1030 and the "soft" font tag 1036. For the second path $p_2$, the number of intermediate nodes is equal to 1 ($n_q$=1). In another example with reference to FIG. 12, there are two paths ($p_1$ and $p_2$) between the "smooth" font tag 1030 and the "scary" font tag 1032. The first path $p_1$ is an indirect connection (smooth→*rounded→scary) with the "rounded" font tag 1034 being an intermediate node between the "smooth" font tag 1030 and the "scary" font tag 1032. The number of intermediate nodes for the first path $p_1$ is equal to 1 ($n_q$=1). The second path $p_2$ is also an indirect connection (smooth→*soft→rounded→scary), with the "soft" font tag 1036 and the "rounded" font tag 1034 being intermediate nodes. The number of intermediate nodes for the second path $p_2$ is equal to 2 ($n_q$=2).

The path score for the i-th path can be determined by the tag association engine 308 as:

Path Score of $i^{th}$ path=$PS_i(Node_{source}, Node_{target})$ $=ES(Node_{source}, n_1)*ES(n_1, n_2)* \ldots *ES(n_{n1}, Node_{target})$   Equation (3)

As indicated in Equation (3), the path score for the i-th path is determined by multiplying the edge scores (denoted as ES) for the edges between the source node ($Node_{source}$) and the target node ($Node_{target}$), including any edges associated with intermediate nodes ($n_1, n_2, \ldots n_{ni}$). For example, as noted above and shown in FIG. 12, there are two paths $p_1$ and $p_2$ between the "smooth" font tag 1030 and "soft" font tag 1036. The path scores ($PS_1$ and $PS_2$) for the first path $p_1$ (smooth→soft) and the second path $p_2$ (smooth→rounded→soft) can be computed as follows:

$PS_1$(smooth,soft)=ES(smooth,soft)=0.167, and $PS_2$(smooth,soft)=ES(smooth,rounded)*ES(rounded, soft)=0.184*0.215=0.0396.

The path score for the source node ($Node_{source}$) and the target node ($Node_{target}$) can be determined by the tag association engine 308 as the highest (or maximum) path score determined for the i-paths between the source node ($Node_{source}$) and the target node ($Node_{target}$). For example, the path score for the source node ($Node_{source}$) and the target node ($Node_{target}$) can be determined:

Path Score=$PS(Node_{source}, Node_{target})$=$Max(PS_i)$ for $1 \leq i \leq p$   Equation (4)

As indicated by Equation (4), the maximum path score determined for the i-paths between the source node ($Node_{source}$) and the target node ($Node_{target}$) is selected as the path score for the path between the source node and target node. Continuing with the example from above referring to FIG. 12, the path scores ($PS_1$ and $PS_2$) for the first path $p_1$ (smooth→soft) and the second path $p_2$ (smooth→rounded→soft) between the "smooth" font tag 1030 and "soft" font tag 1036 were computed as $PS_1$=0.167 and $PS_2$=0.0396. Using the path score Equation (4) above, the path score for the smooth (as source node) and soft (as destination node) font tags will be determined as:

PS(smooth,soft)=max($PS_1, PS_2$)= max(0.167,0.0396)=0.167

In some examples, a path score threshold can be defined as the path score below which the tag association engine 308 will no longer process a particular path. The path score between nodes of the font tag association graph 315 can be determined using the path score determination process described above. In one illustrative example, two font tags $T_1$ and $T_2$ may not be directly correlated or associated when there is an intermediate node between the path from $T_1$ and $T_2$ (e.g., they do not co-occur together in any font, but there is a common font tag between them). Referring to the example shown in FIG. 12, the "smooth" font tag 1030 is indirectly associated with the "soft" font tag 1036, with the "rounded" font tag 1034 being an intermediate node between the "smooth" font tag 1030 and the "soft" font tag 1036. As described above, a higher path score can be determined for the path between the "smooth" font tag 1030 and the "soft" font tag 1036. If none of the path scores for the paths between a first font tag (as a source node) and a second font tag (as a destination node) are above the path score threshold, the tag association engine 308 can determine there is no association (or correlation) between the first font tag and the second font tag.

The tag association engine 308 can perform an associated tag determination process using the path scores in order to determine font tags that are associated (or correlated) with the font tags 307 (e.g., a list of font tags that can include font tags from the image-to-font tag engine 306, font tags from the text tag generation engine 304, and/or the search-based font tags 309). For performing the associated tag determination process, the font tags 307 along with the tag scores determined for the font tags 307 can be denoted as an Initial Tag Map ($M_{init}$). Each element in $M_{init}$ can include a font tag. In some examples, each font tag in $M_{init}$ that has come from a user query (e.g., the search based font tags 309) can be assigned a tag score of 1 (or other suitable value), font tags in $M_{init}$ generated by the image-to-font tag engine 306 from the image 303 can have the tag score determined by the image-to-font tag engine 306 (e.g., as the inverse of the path cost), and font tags in $M_{init}$ generated by the text tag generation engine 304 can be assigned a tag score of 1 (or other suitable value). For associated tags determined by the tag association engine 308, the tag score is equal to the path score determined using Equation (4) described above. The final output map can be denoted as a Result Map ($M_{result}$), and can include the font tags 307 $M_{init}$ plus the associated font tags determined using the associated tag determination process.

An illustrative example implementation of the associated tag determination process is as follows:

$M_{result} = M_{init}$
For each element in $M_{result}$
  For each font tag to which this element is connected and tag has not been processed
    Path Score=Initial Path Score of current element*edge_score (source, destination)
    If Path Score>minimum threshold
      Tag Score=Path Score
      Add (font tag, Tag Score) to $M_{result}$
Return $M_{result}$ As shown from the illustrative example, starting with an initial path score (e.g., an initial path score=1.0 or other suitable value), the tag association engine 308 travels along the font tag association graph 315 and multiples the path score with the edge score values (e.g., determined using Equation (1) or Equation (2)) on the edges of the font tag association graph 315 that are travelled through to obtain a final path score for the source and destination tags. Once a destination tag is reached for the source tag, the final path score is taken as the tag score of the destination tag (which is the associated font tag for the source tag). The associated font tag and the tag score for the associated font tag are added to the final result map ($M_{result}$). As noted above, $M_{result}$ includes the font tags 307 and the associated font tags determined using the associated tag determination process. An updated font tag data structure (e.g., an n-tuple with n being the number of font tags accessible by the software application, a vector representation, or the like) can be generated for the electronic document 301 based on $M_{result}$. The updated font tag data structure includes tag score values for all available font tags, and the tag scores are updated based on $M_{result}$. In the updated font tag data structure, one or more font tags that had a value of 0 in the font tag data structure generated for the font tags 307 can have new values indicating the tag scores for the one or more font tags.

In some implementations, an incremental update can be performed for the font tag association graph 315. For example, each time one or more fonts are added to database of fonts the font recommendation system 300 has access to, the font tags can be obtained for the one or more new fonts. The font tag association graph can be updated using the font tags for the one or more new fonts, and the associated tag determination process can be performed.

The final result map ($M_{result}$) generated for the electronic document 301 can be provided to the font search engine 310. The font search engine 310 can perform a font space search using the updated font tag data structure (e.g., an n-tuple, a vector representation, or the like) to determine the one or more recommended fonts 317. In some cases, the updated font tag data structure can be generated by the tag association engine 308, which can output the updated font tag data structure to the font search engine 310. In some cases, the tag association engine 308 can output the font tags in the $M_{result}$ to the font search engine 310, and the font search engine 310 can generate the updated data structure. The font search engine 310 can plot the updated data structure in a font space in which the font tags of the various available fonts are plotted. For example, all of the fonts are tagged with a combination of one or more tags, and hence will lie on a vertex of a unit cube in the n-dimensional space (where n is the number of font tags accessible by the software application). The font search engine 310 can determine the one or more recommended fonts 317 by performing the font space search, which as described below can include comparing (e.g., based on a distance metric or other similarity metric) the font tags in the updated data structure to the font tags of the available fonts.

In one illustrative example, the font search engine 310 can plot the n-tuple including the tag scores for the various fonts (where n is the number of font tags accessible by the software application) in the font space and can perform the font space search. To perform the font space search and generate the one or more recommended fonts 317, the font search engine 310 can create an n-tuple result from $M_{result}$ (as noted above, the n-tuple can also be referred to as a font space tuple). As noted above, in some cases, the tag association engine 308 can generate the n-tuple. The n-tuple can be generated by assigning a value of 0 in the n-tuple for every tag not present in $M_{result}$. For example, the n-tuple includes an entry for every font tag that is available to the software application implementing the font recommendation system 300. The entries in the n-tuple that belong to font tags not present in $M_{result}$ are assigned a value of 0. The font search engine 310 can assign the sigmoid of the tag score (denoted as Sigmoid(tag_score)) to each entry in the n-tuple that belongs to a font tag that is present in $M_{result}$. The sigmoid can be used to normalize the tag scores (e.g., between values 0-1). In some examples, the actual tag scores of font tags present in $M_{result}$ can be assigned to the entries of the font tag. Using the n-tuple, the font search engine 310 can find a distance (e.g., Euclidean distance or other distance) between the values in the n-tuple and each font in the font space. The font search engine 310 can output all the fonts (e.g., a list of the fonts) in a decreasing order of their distance from the n-tuple. A certain number of the fonts having the shortest distance to the n-tuple can be selected as the one or more recommended fonts 317. The number of fonts to use for the one or more recommended fonts 317 can be a user selectable setting or can be a pre-configured setting that cannot be changed by a user.

FIG. 13 is a conceptual diagram illustrating an example of a font search performed in a three-dimensional (3D) font space 1300. The 3D font space 1300 is represented as a unit cube shown along an x-axis (in a horizontal direction), a y-axis (in a vertical direction), and a z-axis (in a depth direction relative to the x- and y-axes). In general, each dimension of a font corresponds to a font tag. In practical scenarios, there can be thousands of font tags and the corresponding font space would have the thousands of dimensions. The 3D font space 1300 is shown as an illustrative example for explanatory purposes. The 3D space 1300 can support three font tags, with a first font tag corresponding to the x-dimension, a second font tag corresponding to the y-dimension, and a third font tag corresponding to the z-dimension.

Seven fonts are shown in FIG. 13 (labeled as F1, F2, F3, F4, F5, F6, and F7), with each font lying on a vertex of the unit cube representing the 3D font space 1300. For example, the fonts F1-F7 are tagged with a combination of one or more of the three font tags, and therefore lie on a vertex of the unit cube in the 3D font space 1300. When a font is tagged with a font tag, that font tag is assigned a value (similar to the tag score value) of 1. For example, as shown in FIG. 13, the font F1 is tagged with the first font tag and not with the second and third font tags, and thus has a font space tuple (or n-tuple, where n=3 in the example of FIG. 13) of (1,0,0). In another example, the font F3 is tagged with the first font tag and the second font tag, and has a font space tuple (or n-tuple, where n=3) of (1,1,0). In another example, the font F6 is tagged with the second font tag and the third font tag, and thus has a font space tuple (or n-tuple, where n=3) of (0,1,1). In another example, the font F7 is tagged with the first font tag, the second font tag, and the third font tag, and thus has a font space tuple (or n-tuple, where n=3) of (1,1,1). The font space tuples of the other fonts are also shown in FIG. 13.

The font search engine 310 can determine the Euclidean distance (or other distance or similarity measure) from each of the fonts F1-F7 to the font space tuple 1330 (or n-tuple) representing an electronic document (e.g., the electronic document 301). For example, as shown in FIG. 13, the font space tuple 1330 (or n-tuple) representing the electronic document is set to (0.9, 0.67, 0.75), including a tag score value of 0.9 for the first font tag, a tag score value of 0.67 for the second font tag, and a tag score value of 0.75 for the third font tag. In some examples, as noted above, a tag score value of an entry in the font space tuple can be 0. The Euclidean distance (or other distance or similarity measure) can be measured from the fonts F1-F7 to the font space tuple 1330 by comparing the values in the font space tuple 1330 to the values of the font space tuples for the various fonts F1-F7. The font search engine 310 can output the fonts F1-F7 in a decreasing order of their distance from the font space tuple 1330, and can select the fonts that are a closest match to the font space tuple 1330 representing the electronic document as recommended fonts 317. For example, the font space tuple (1,1,1) of the font F7 is a closest match to the font space tuple 1330, the font space tuple (1,1,0) of the font F3 is a second closest match to the font space tuple 1330, and the font space tuple (0,1,1) of the font F6 is a third closest match to the font space tuple 1330. The font search engine 310 can output the fonts F3, F6, and F7 as recommended fonts 317.

Figure 14:
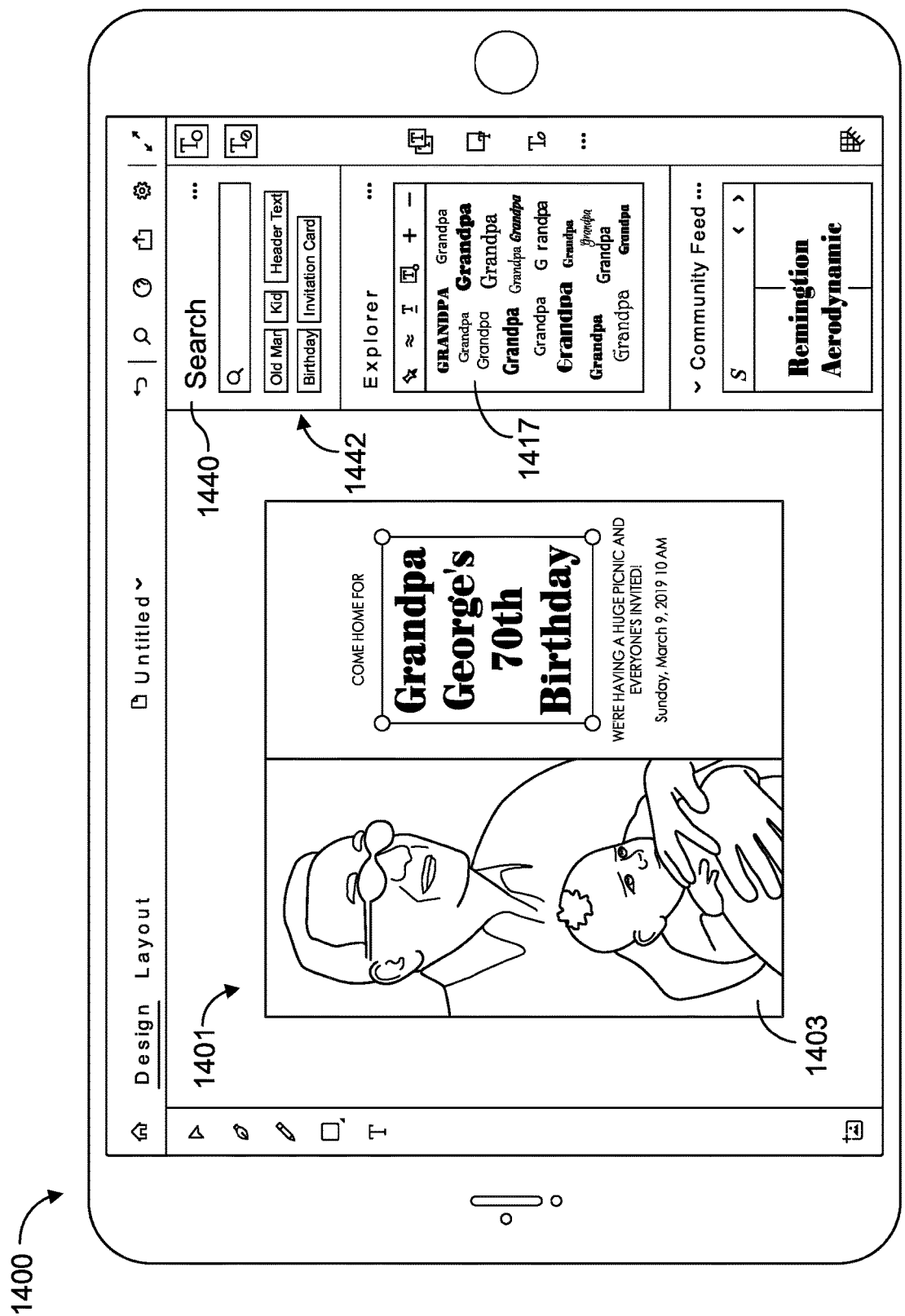
FIG. 14 is a conceptual view of an example user interface of a design application implementing the font recommendation system, in accordance with some examples provided herein.

FIG. 14 is a conceptual view of an example user interface 1400 of a design application implementing the font recommendation system 300. An electronic document 1401 is shown in the user interface 1400. The electronic document 1401 includes an image 1403 of an older man and a young child, as well as various textual information. A set of font tags 1442 are shown, including an "older man" font tag, a "kid" font tag, a "header text" font tag, a "birthday" font tag, and an "invitation card" font tag. One or more of the font tags 1442 (e.g., the "older man" and "kid" font tags) can be generated using the image tag generation engine 302 and the image-to-font tag engine 306 based on the image 1403 of the older man and the young child, as described above. One or more of the font tags 1442 (e.g., the "birthday" and "invitation card" font tags) can be generated by the text tag generation engine 304 using the text (including the text 1405) of the electronic document 1401, as described above. In some implementations, one or more of the font tags 1442 (e.g., the "header text" font tag) can be generated based on one or more keywords entered by a user into the search field 1440. For example, the user can enter the keywords "header text" in the search field 1440, and the keywords can be used as a font tag.

As shown, the "kid" font tag has been disabled. A user can disable a font tag from being used in the font search process. For example, the user designing the electronic document 1401 may not want any recommended fonts that are typically recommended for a "kid" type of audience or user group, and instead may desire fonts used for more mature user groups. The user can disable the "kid" font tag in order to prevent that font tag from being used in the font search, which can result in the tag score for the "kid" font tag being assigned a 0 value in the font space tuple generated for the electronic document 1401.

A group of recommended fonts 1417 are shown in the user interface 1400. The recommended fonts 1417 can be determined by the font search engine 310 using the techniques described above. For example, a font space tuple include tag score values for the font tags 1442 generated for the electronic document 1401 can be compared with the font space tuples of all available fonts (e.g., using a distance metric or other similarity metric). The recommended fonts 1417 can include the top-matching fonts resulting from the comparison.

Figure 15:
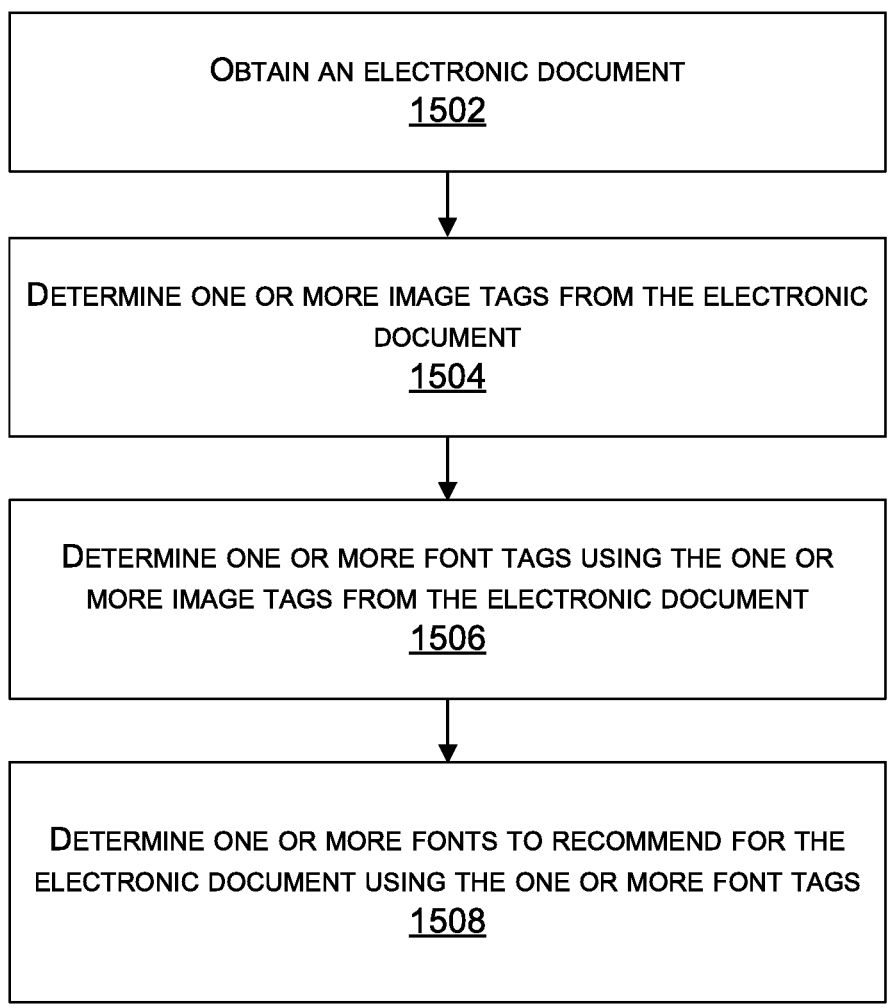
FIG. 15 is a flowchart illustrating an example of a process of determining one or more font recommendations, in accordance with some examples provided herein.

An example of a process performed using the techniques described herein will now be described. FIG. 15 is a flowchart illustrating an example of a process 1500 for determining one or more font recommendations. At block 1502, the process 1500 includes obtaining an electronic document. As described above, the electronic document can include any item of electronic media content that can be used in an electronic form (e.g., displayed by a display device) and/or as printed output. For instance, the electronic document can include an item of digital artwork, a webpage, a page of an application (e.g., a mobile application, a desktop computer application, or other application software), an electronic birthday invitation, an electronic greeting card, a photograph and/or video that may or may not include text, among others. One illustrative example of an electronic document 1401 is shown in FIG. 14.

At block 1504, the process includes determining one or more image tags from the electronic document. For example, the process 1500 can include obtaining at least one image of the electronic document and classifying one or more objects in the at least one image. The process 1500 can include determining the one or more image tags from the electronic document based on the classified one or more objects. As noted above, the at least one image can include an image (e.g., a rasterized image or vector graphic) of the electronic document, such as an image of the entire electronic document. For instance, an image of the electronic document can be obtained by capturing a screen capture of the electronic document. In some implementations when the design of the electronic document includes multiple layers of media (e.g., one or more image layers and one or more text layers), the one or more image layers can be extracted and the one or more text layers can be excluded from the image of the electronic document. In some examples, the at least one image can be one image (e.g., a rasterized image or vector graphic) that is included in the electronic document.

In some examples, classifying the one or more objects in the at least one image includes determining a plurality of probabilities for each object of the one or more objects. Each probability of the plurality of probabilities is associated with a different class from a plurality of categories. If the probability that an object is a particular class is above a probability threshold, the object can be determined to be that class of object. In some cases, as described above, a machine learning model (e.g., a neural network, such as a CNN) can be used to classify the one or more objects in the at least one image, and can include a perspective classification model that classifies objects into classes belonging to different categories or perspectives. In the illustrative example used above, the four categories or perspectives include a "user group" category (with older, middle aged, and child classes), a "genre" category (with comic, funky, retro, and sci-fi classes), a "media" category (with oil-painting, pencil-sketched, and water color classes), and a "mood" category (with happy, horror, and peaceful classes). The example categories can have fewer classes or additional classes, and other categories and associated classes can also be defined. In some cases, as described above, the machine learning model used to classify the one or more objects can include different neural networks (or other types of a machine learning models) for each category (e.g., a first neural network for a first category, a second neural network for a second category, and so on).

At block 1506, the process includes determining one or more font tags using the one or more image tags from the electronic document. For example, determining the one or more font tags using the one or more image tags can include mapping the one or more image tags to the one or more font tags. In some examples, the one or more image tags can be mapped to the one or more font tags by the image-to-font tag engine 306 using a designer map and/or a user map, as described above. For instance, the image-to-font tag engine 306 can use the designer map, the user map, and in some cases one or more contextual synonyms of each image tag to map the one or more image tags to the one or more font tags. The mapping can be performed for each image tag generated for the at least one image of the electronic document. In some cases, the process 1500 can include computing a path cost to travel from each image tag to zero or more font tags, and can compute a tag score for each font tag (e.g., as the inverse of a minimum path cost needed to get to that font tag, or using any other suitable computation).

As described above, text from the electronic document can also be used (e.g., by the text tag generation engine 304) to generate at least one font tag. For example, the process 1500 can include determining text from the electronic document, and determining at least one font tag using the text from the electronic document. In some examples, the process 1500 can include determining a subset of words from the text based on natural language processing of the text, and determining the at least one font tag as the subset of words from the text. The process 1500 can include determining the one or more fonts to recommend for the electronic document using the one or more font tags and the at least one font tag.

At block 1508, the process includes determining one or more fonts to recommend for the electronic document using the one or more font tags. In some examples, the process 1500 can include determining one or more additional font tags associated with the one or more font tags, in which case the process 1500 can include determining the one or more fonts to recommend for the electronic document using the one or more font tags and the one or more additional font tags. For example, the tag association engine 308 of FIG. 3 can be used to determine the one or more additional font tags based on the font tags generated from the at least one image of the electronic document and in some cases the font tags generated from the text of the electronic document.

In some examples, one or more font tags can be determined based on user search queries, such as when a user searches for a particular font. When one or more font tags are generated based on one or more search queries, the process 1500 can include determining the one or more fonts to recommend for the electronic document using the search-query based font tags in addition to any other font tags that have been generated.

The font tags generated using the electronic document can be compared to font tags that have been assigned to available fonts in order to determine the one or more fonts to recommend for the electronic document. For example, the process 1500 can include generating a data structure including a value for each font tag of the one or more font tags, and obtaining one or more values for each font of a plurality of stored fonts. The plurality of stored fonts can include available fonts accessible by the font recommendation system 300 (e.g., from a local storage location on a computing device including the font recommendation system 300, from a remote storage location, such as a server-based system).

The process 1500 can include comparing the data structure to the one or more values for each font of the plurality of stored fonts, and determining the one or more fonts to recommend for the electronic document from the plurality of stored fonts based on comparing the data structure to the one or more values for each font of the plurality of stored fonts. Comparing the data structure to the one or more values for each font of the plurality of stored fonts can include determining one or more distances (e.g., Euclidean distance, Manhattan distance, or other distance or similarity measure) between values in the data structure and the one or more values for each font of the plurality of stored fonts.

The process 1500 can include determining one or more values associated with the one or more fonts as having a smaller distance from values of the data structure as compared to one or more other fonts of the plurality of stored fonts. The process 1500 can include determining the one or more fonts to recommend based on the one or more values associated with the one or more fonts having the smaller distance from values of the data structure as compared to the one or more other fonts of the plurality of stored fonts. For instance, referring to FIG. 13 as an illustrative example, the font search engine 310 can determine a distance from each of the fonts F1-F7 to the font space tuple 1330 (with tag scores (0.9, 0.67, 0.75)) representing an electronic document. The distance can be measured from the fonts F1-F7 to the font space tuple 1330 by comparing the values in the font space tuple 1330 to the values of the font space tuples for the various fonts F1-F7. The font search engine 310 can output the fonts F1-F7 in a decreasing order of their distance from the font space tuple 1330, and can select the closest matching fonts F3, F6, and F6 as recommended fonts 317.

Figure 16:
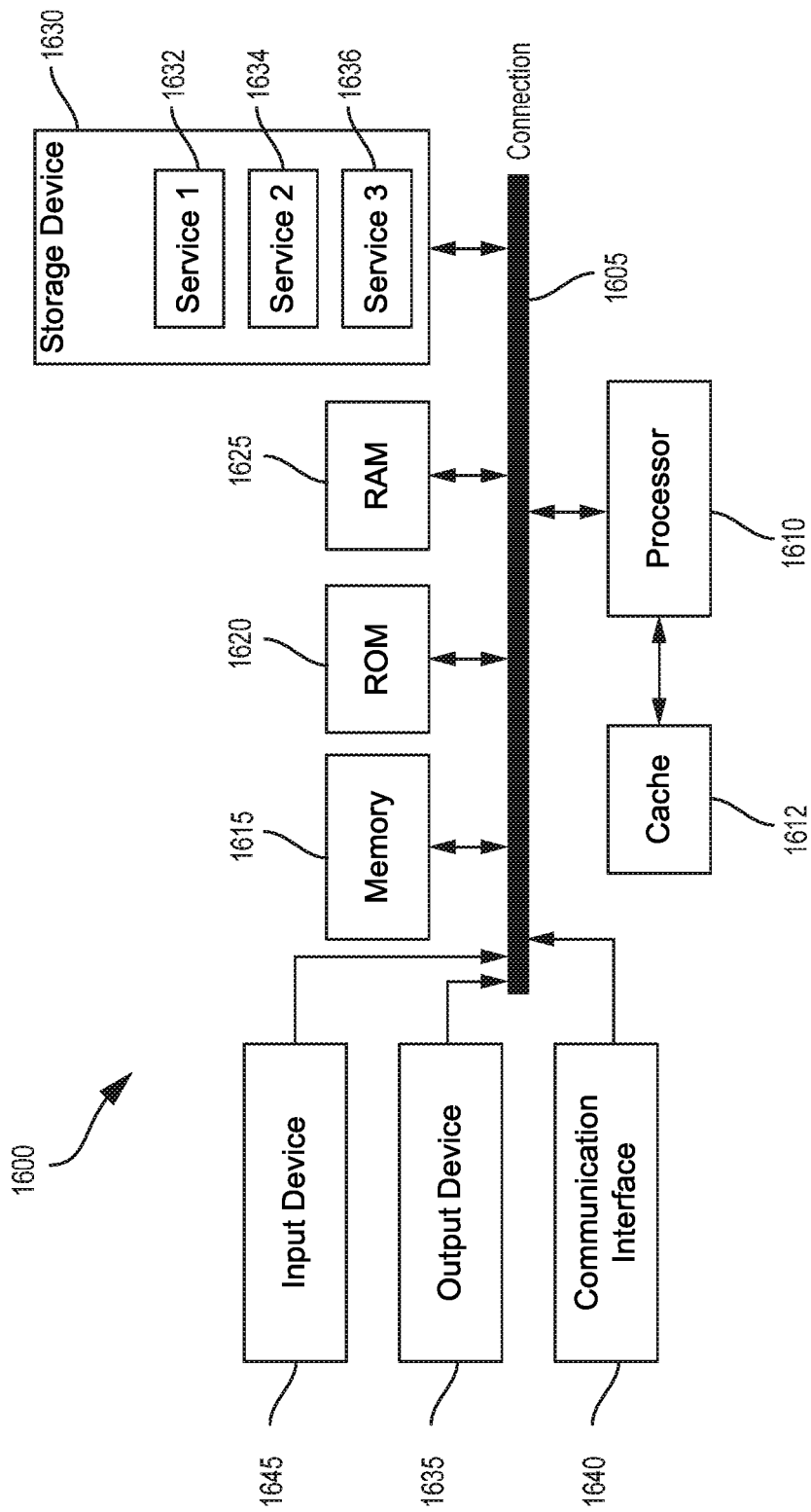
FIG. 16 is an example computing device architecture of an example computing device that can implement the various techniques described herein.

In some examples, the process 1500 may be performed by a computing device or apparatus, such as a computing device having the computing device architecture 1600 shown in FIG. 16. In one example, the process 1500 can be performed by a computing device with the computing device architecture 1600 implementing the font recommendation system 300. The computing device can include any suitable device, such as a mobile device (e.g., a mobile phone), a wearable device, a server (e.g., in a software as a service (SaaS) system or other server-based system), and/or any other computing device with the resource capabilities to perform the process 1500. In some cases, the computing device or apparatus may include various components, such as an input device, an image tag generation engine, an image-to-font tag engine 306, a text tag generation engine, a tag association engine, a font search engine, one or more output devices, one or more processors, one or more microprocessors, one or more microcomputers, and/or other component that is configured to carry out the steps of process 1500. In some examples, the computing device may include a display, a network interface configured to communicate and/or receive the data, any combination thereof, and/or other component(s). The network interface may be configured to communicate and/or receive Internet Protocol (IP) based data or other type of data over any suitable wired or wireless network (e.g., a WiFi network, a cellular broadband network, the Internet, a Bluetooth™ network, and/or any other type of wireless network).

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 1500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 16 illustrates an example computing device architecture 1600 of an example computing device which can implement the various techniques described herein. For example, the computing device architecture 1600 can implement the font recommendation system 300 shown in FIG. 3. The components of computing device architecture 1600 are shown in electrical communication with each other using connection 1605, such as a bus. The example computing device architecture 1600 includes a processing unit (CPU or processor) 1610 and computing device connection 1605 that couples various computing device components including computing device memory 1615, such as read only memory (ROM) 1620 and random access memory (RAM) 1625, to processor 1610.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1600, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communications interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of determining one or more font recommendations, comprising:
    obtaining an electronic document comprising one or more images and text;
    processing the one or more images of the electronic document using a plurality of neural networks to determine one or more image tags from the electronic document, each neural network of the plurality of neural networks determining a different category of a set of categories of image tags, wherein the set of categories include one or more of a user group, genre, media, or mood of the one or more images, the image tags representing classes associated with the one or more images;
    determining one or more font tags based on one or more tag scores computed between the one or more font tags and the one or more image tags from the electronic document using a plurality of image tag to font tag maps, wherein the one or more font tags include one or more keywords used to search for fonts;
    processing the text of the electronic document using a text tag generation engine to generate a set of words of interest to be used as text font tags for the electronic document
    augmenting the one or more font tags to include the text font tags; and
    determining one or more fonts to recommend for the electronic document using the one or more font tags.

2. The method of claim 1, further comprising:
    obtaining at least one image of the electronic document;
    classifying one or more objects in the at least one image; and
    determining the one or more image tags from the electronic document based on the classified one or more objects.

3. The method of claim 2, wherein classifying the one or more objects in the at least one image includes determining a plurality of probabilities for each object of the one or more objects, each probability of the plurality of probabilities being associated with a different class from a plurality of categories.

4. The method of claim 1, wherein determining the one or more font tags using the one or more image tags includes:
mapping the one or more image tags to the one or more font tags.

5. The method of claim 1, further comprising:
determining one or more additional font tags associated with the one or more font tags; and
determining the one or more fonts to recommend for the electronic document using the one or more font tags and the one or more additional font tags.

6. The method of claim 1, further comprising:
generating a data structure including a value for each font tag of the one or more font tags;
obtaining one or more values for each font of a plurality of stored fonts;
comparing the data structure to the one or more values for each font of the plurality of stored fonts; and
determining the one or more fonts to recommend for the electronic document from the plurality of stored fonts based on comparing the data structure to the one or more values for each font of the plurality of stored fonts.

7. The method of claim 6, wherein comparing the data structure to the one or more values for each font of the plurality of stored fonts includes determining one or more distances between values in the data structure and the one or more values for each font of the plurality of stored fonts.

8. The method of claim 7, further comprising:
determining one or more values associated with the one or more fonts as having a smaller distance from values of the data structure as compared to one or more other fonts of the plurality of stored fonts; and
determining the one or more fonts to recommend based on the one or more values associated with the one or more fonts having the smaller distance from values of the data structure as compared to the one or more other fonts of the plurality of stored fonts.

9. A system for determining one or more font recommendations, comprising:
one or more processors; and
memory accessible to the one or more processors, the memory storing instructions, which upon execution by the one or more processors, cause the one or more processors to:
obtain an electronic document comprising one or more images and text;
process the one or more images of the electronic document using a plurality of neural networks to determine one or more image tags from the electronic document, each neural network of the plurality of neural networks determining a different category of a set of categories of image tags, wherein the set of categories include one or more of a user group, genre, media, or mood of the one or more images, the image tags representing classes associated with the one or more images;
determine one or more font tags based on one or more tag scores computed between the one or more font tags and the one or more image tags from the electronic document using a plurality of image tag to font tag maps, wherein the one or more font tags include one or more keywords used to search for fonts;
process the text of the electronic document using a text tag generation engine to generate a set of words of interest to be used as text font tags for the electronic document;
augment the one or more font tags to include the text font tags; and
determine one or more fonts to recommend for the electronic document using the one or more font tags.

10. The system of claim 9, wherein the one or more processors are configured to:
obtain at least one image of the electronic document;
classify one or more objects in the at least one image; and
determine the one or more image tags from the electronic document based on the classified one or more objects.

11. The system of claim 10, wherein classifying the one or more objects in the at least one image includes determining a plurality of probabilities for each object of the one or more objects, each probability of the plurality of probabilities being associated with a different class from a plurality of categories.

12. The system of claim 9, wherein determining the one or more font tags using the one or more image tags includes:
mapping the one or more image tags to the one or more font tags.

13. The system of claim 9, wherein the one or more processors are configured to:
determine one or more additional font tags associated with the one or more font tags; and
determine the one or more fonts to recommend for the electronic document using the one or more font tags and the one or more additional font tags.

14. The system of claim 9, wherein the one or more processors are configured to:
generate a data structure including a value for each font tag of the one or more font tags;
obtain one or more values for each font of a plurality of stored fonts;
compare the data structure to the one or more values for each font of the plurality of stored fonts; and
determine the one or more fonts to recommend for the electronic document from the plurality of stored fonts based on comparing the data structure to the one or more values for each font of the plurality of stored fonts.

15. A non-transitory computer-readable medium having stored thereon instructions that, when executed by one or more processors, cause the one or more processors to:
obtain an electronic document comprising one or more images and text;
process the one or more images of the electronic document using a plurality of neural networks to determine one or more image tags from the electronic document, each neural network of the plurality of neural networks determining a different category of a set of categories of image tags, wherein the set of categories include one or more of a user group, genre, media, or mood of the one or more images, the image tags representing classes associated with the one or more images;
determine one or more font tags based on one or more tag scores computed between the one or more font tags and the one or more image tags from the electronic document using a plurality of image tag to font tag maps, wherein the one or more font tags include one or more keywords used to search for fonts;
process the text of the electronic document using a text tag generation engine to generate a set of words of interest to be used as text font tags for the electronic document
augment the one or more font tags to include the text font tags; and
determine one or more fonts to recommend for the electronic document using the one or more font tags.

16. The non-transitory computer-readable medium of claim 15, further comprising instructions that, when executed by one or more processors, cause the one or more processors to:
- determine text from the electronic document;
- determine at least one font tag using the text from the electronic document; and
- determine the one or more fonts to recommend for the electronic document using the one or more font tags and the at least one font tag.

\* \* \* \* \*